(12) United States Patent
Tachibana et al.

(10) Patent No.: US 9,776,685 B2
(45) Date of Patent: Oct. 3, 2017

(54) FRONT DERAILLEUR

(71) Applicant: Shimano Inc., Sakai, Osaka (JP)

(72) Inventors: Hiroshi Tachibana, Osaka (JP); Yuuta Mizutani, Osaka (JP); Keijiro Nishi, Osaka (JP); Kazuya Kuwayama, Osaka (JP); Atsuhiro Emura, Osaka (JP); Kenkichi Inoue, Osaka (JP)

(73) Assignee: Shimano Inc., Osaka (JP)

( * ) Notice: Subject to any disclaimer, the term of this patent is extended or adjusted under 35 U.S.C. 154(b) by 588 days.

(21) Appl. No.: 14/154,616

(22) Filed: Jan. 14, 2014

(65) Prior Publication Data
US 2014/0148287 A1 May 29, 2014
US 2017/0233036 A9 Aug. 17, 2017

Related U.S. Application Data

(63) Continuation-in-part of application No. 13/705,381, filed on Dec. 5, 2012, now abandoned.

(51) Int. Cl.
*B62M 9/132* (2010.01)
*B62M 3/00* (2006.01)

(52) U.S. Cl.
CPC .............. *B62M 9/132* (2013.01); *B62M 3/00* (2013.01)

(58) Field of Classification Search
CPC .......... B62M 3/00; B62M 9/12; B62M 9/121; B62M 9/122; B62M 9/124; B62M 9/1244; B62M 9/131; B62M 9/132; B62M 9/134; B62M 9/1344; B62M 2009/12406; B62M 2009/12413
See application file for complete search history.

(56) References Cited

U.S. PATENT DOCUMENTS

| | | | |
|---|---|---|---|
| 7,341,532 B2 | 3/2008 | Ichida et al. | |
| 7,704,173 B2 | 4/2010 | Ichida et al. | |
| 7,722,487 B2 | 5/2010 | Ichida et al. | |
| 7,824,285 B2 * | 11/2010 | Tan ...................... | B62M 9/1244 474/80 |
| 2004/0063528 A1 * | 4/2004 | Campagnolo .......... | B62M 9/122 474/70 |
| 2005/0239587 A1 * | 10/2005 | Ichida .................... | B62M 9/122 474/82 |
| 2008/0125259 A1 * | 5/2008 | Kunisawa .............. | B62M 9/126 474/82 |
| 2013/0085024 A1 * | 4/2013 | Inoue ..................... | B62M 9/136 474/80 |
| 2014/0018199 A1 * | 1/2014 | Shahana ................. | B62M 9/121 474/82 |
| 2014/0155205 A1 * | 6/2014 | Kuwayama ............ | B62M 9/135 474/80 |

* cited by examiner

*Primary Examiner* — Sang Kim
*Assistant Examiner* — Juan Campos, Jr.
(74) *Attorney, Agent, or Firm* — Global IP Counselors, LLP

(57) ABSTRACT

A front derailleur basically includes a fixed member, a movable member, a driven link and a first link. The fixing member is configured to be fixed to a bicycle frame. The movable member is movably supported with respect to the fixed member. The driven link is operatively coupled to the movable member. The first link movably connects the movable member to the fixed member, and is adjustably coupled to the driven link in a fixed position by a fixing structure to establish a fixed rest position of the movable member with respect to the fixed member.

19 Claims, 21 Drawing Sheets

FRONT DERAILLEUR

CROSS-REFERENCE TO RELATED APPLICATIONS

This application is a continuation application of U.S. patent application Ser. No. 13/705,381, filed on Dec. 5, 2012. The entire disclosure of U.S. patent application Ser. No. 13/304,336 is hereby incorporated herein by reference.

BACKGROUND

Field of the Invention

This invention generally relates to a front derailleur for a bicycle. More specifically, the present invention relates to a front derailleur having a movable member movable relative to a fixed member with a rest position of the movable member being adjustable relative to the fixed member.

Background Information

Generally, a front derailleur is mounted to the bicycle frame adjacent to the front chain rings to shift a chain laterally between the front chain rings. A front derailleur includes a fixed or base member that is non-movably secured to the bicycle frame. A front derailleur further includes a movable member or chain guide that is movably supported relative to the fixed member such that the chain guide moves between at least two lateral shift positions to shift the chain between the front chain rings. Typically, a linkage assembly is coupled between the fixed member and the chain guide in order to movably support the chain guide. The chain guide typically has a pair of cage plates or guide plates arranged to selectively contact and move the chain between the front chain rings. The cage plates or guide plates form lateral sides of a chain cage portion of the chain guide.

SUMMARY

Generally, the present disclosure is directed to a front derailleur. In one feature, a front derailleur has a movable member in which a fixed rest position of the movable member is adjustable.

In view of the state of the known technology, a front derailleur is provided that basically comprises a fixed member, a movable member, a driven link and a first link. The fixing member is configured to be fixed to a bicycle frame. The movable member is movably supported with respect to the fixed member. The driven link is operatively coupled to the movable member. The first link movably connects the movable member to the fixed member, and is adjustably coupled to the driven link=in a fixed position by a fixing structure to establish a fixed rest position of the movable member with respect to the fixed member.

In accordance with a second aspect of the present invention, the front derailleur according to the first aspect is configured so that the first link and the driven link are pivotally mounted on the fixed member about a single pivot axis.

In accordance with a third aspect of the present invention, the front derailleur according to the second aspect is configured so that the fixing structure abuts opposite circumferentially facing sides of the driven link with respect to the pivot axis to establish the fixed rest position of the movable member.

In accordance with a fourth aspect of the present invention, the front derailleur according to the first aspect is configured so that the fixing structure includes a first bolt screwed into one of the first link and the driven link and abutting the other of the first link and the driven link, and a second bolt mounted on the one of the first link and the driven link and threaded into a movable abutment member that moves axially along a threaded shaft of the second bolt and that abuts the other of the first link and the driven link as the second bolt is turned about its screwing axis.

In accordance with a fifth aspect of the present invention, the front derailleur according to the fourth aspect is configured so that the other of the first link and the driven link includes a first inclined contact surface that inclines with respect to the screwing axis, and the movable abutment member includes a second inclined contact surface that inclines with respect to the screwing axis so as to face and contact the first inclined contact surface to prevent movement of the other of the first link and the driven link.

In accordance with a sixth aspect of the present invention, the front derailleur according to the fourth aspect is configured so that the first bolt is screwed into the first link and abuts the driven link, and the second bolt is mounted on the first link and the movable abutment member abuts the driven link.

In accordance with a seventh aspect of the present invention, the front derailleur according to the sixth aspect is configured so that the driven link includes a first inclined contact surface that inclines with respect to the screwing axis, and the movable abutment member includes a second inclined contact surface that inclines with respect to the screwing axis so as to face and contact the first inclined contact surface to prevent movement of the driven link.

In accordance with an eighth aspect of the present invention, the front derailleur according to the first aspect is configured so that the fixing structure includes a positioning member inserted into the first link and the driven link so as to adjustably position the first link relative to the driven link.

In accordance with a ninth aspect of the present invention, the front derailleur according to the eighth aspect is configured so that the first link and the driven link are pivotally mounted on the fixed member about a single pivot axis, and the positioning member adjustable positions the first link relative to the driven link around the single pivot axis.

In accordance with a tenth aspect of the present invention, the front derailleur according to the ninth aspect is configured so that one of the first link and the driven link includes a threaded screw bore and the other of the first link and the driven link includes a receiving portion. The positioning member includes a threaded portion screwed into the threaded screw bore, and a shaft portion disposed in the receiving portion.

In accordance with an eleventh aspect of the present invention, the front derailleur according to the tenth aspect is configured so that the receiving portion is an elongated slot extending along inward and outward direction with respect to a bicycle frame when the fixed member is fixed to the bicycle frame.

In accordance with a twelfth aspect of the present invention, the front derailleur according to the eleventh aspect is configured so that the shaft portion has a center axis that is offset from a center axis of the threaded portion.

In accordance with a thirteenth aspect of the present invention, the front derailleur according to the tenth aspect is configured so that the first link and the driven link that includes the receiving portion further includes at least one additional receiving portion. The receiving portions are arranged in inward and outward direction with respect to a bicycle frame when the fixed member is fixed to the bicycle frame. The shaft portion is configured to be selectively disposed into one of the receiving portions.

In accordance with a fourteenth aspect of the present invention, the front derailleur according to the tenth aspect is configured so that the fixing structure includes a fastening member configured to fasten the threaded portion to prevent the threaded portion from being loosened with respect to the threaded screw bore.

In accordance with a fifteenth aspect of the present invention, the front derailleur according to the first aspect is configured so that the fixed member includes a base member and a motor unit, the motor unit having an output shaft operatively coupled to the driven link.

In accordance with a sixteenth aspect of the present invention, the front derailleur according to the first aspect further comprises a second link movably connecting the movable member to the fixed member.

In accordance with a seventeenth aspect of the present invention, the front derailleur according to the sixteenth aspect is configured so that the first and second links are pivotally connected to the fixed member and the movable member, and the movable member includes a chain cage portion.

In accordance with an eighteenth aspect of the present invention, the front derailleur according to the seventeenth aspect is configured so that the first link is disposed between the chain cage portion and the second link.

Other objects, features, aspects and advantages of the disclosed front derailleur will become apparent to those skilled in the art from the following detailed description, which, taken in conjunction with the annexed drawings, discloses preferred embodiments of the front derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided fir illustration only and not for the purpose of limiting the invention as defined by the appended claims and their equivalents.

Figure 1:
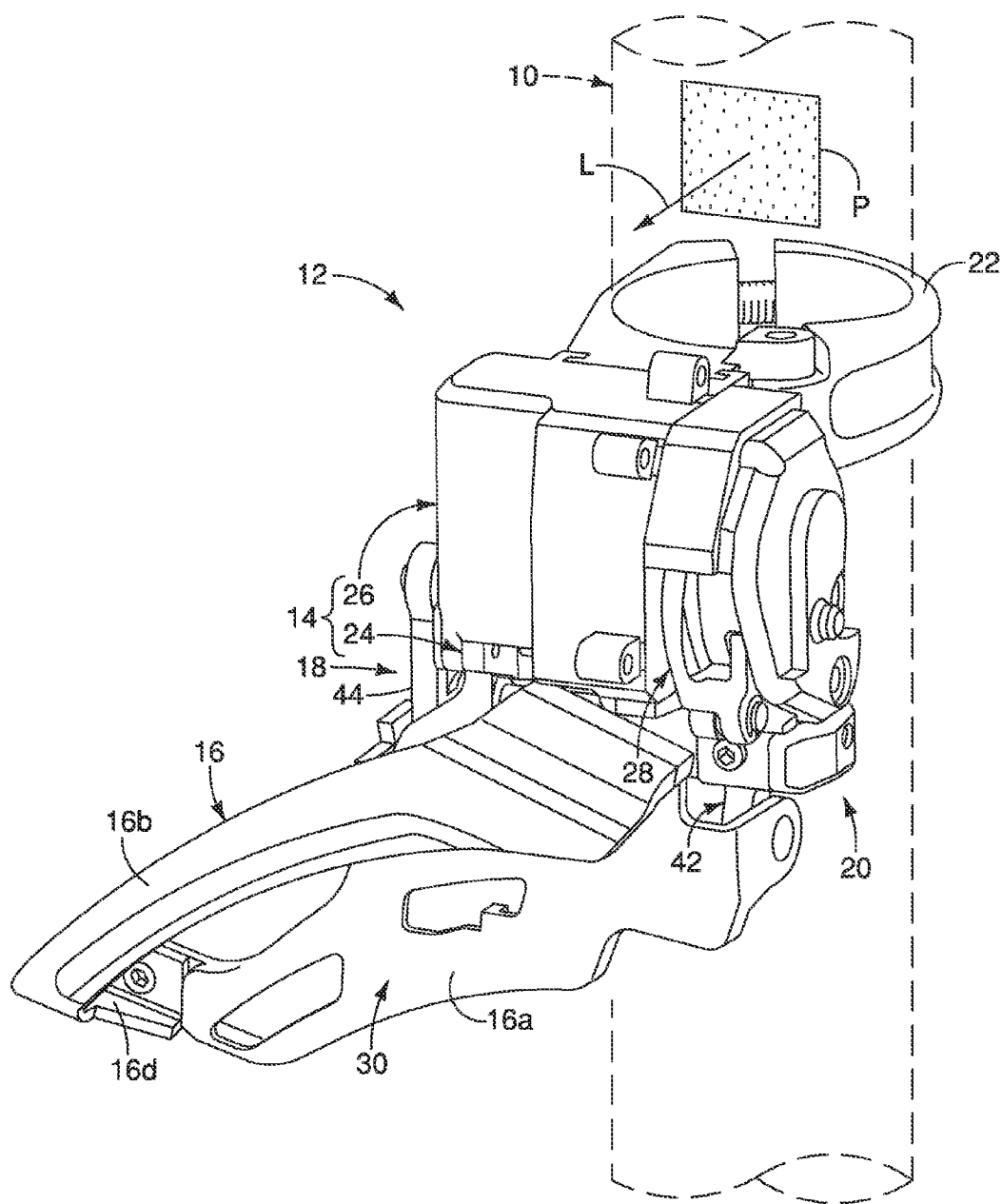
FIG. 1 is a partial side perspective view of a portion of a bicycle frame having a front derailleur in accordance with a first embodiment.

Referring initially to FIG. 1, a portion of a bicycle frame 10 is illustrated with a front derailleur 12 in accordance with one embodiment. The front derailleur 12 basically includes a fixed member 14, a movable member 16 (e.g., a chain guide) and a support linkage 18. In the illustrated embodiment, the front derailleur 12 further includes a fixing structure 20 that is operatively coupled to the support linkage 18 to establish a fixed rest position of the movable member 16 with respect to the fixed member 14. The fixing structure 20 is configured to provide adjustment of a fixed rest position of the movable member 16 with respect to the fixed member 14 in a lateral direction L.

As seen in FIG. 1, the fixed member 14 is configured to be directly fixed to the bicycle frame 10 (e.g., seat tube) by a hinged type seat tube clamp 22. Thus, the fixed member 14 constitutes a mounting fixture for supporting the front derailleur 12 on the bicycle frame 10. In the illustrated embodiment, the seat tube clamp 22 is preferably detachable from the fixed member 14 by a bolt (not shown). However, the fixed member 14 can have other types of attachment structures as needed and/or desired. The movable member 16 is movably supported with respect to the fixed member 14 by the support linkage 18 so that the movable member 16 can move in the lateral direction L with respect to a vertical center plane P of the bicycle frame 10.

Figure 2:
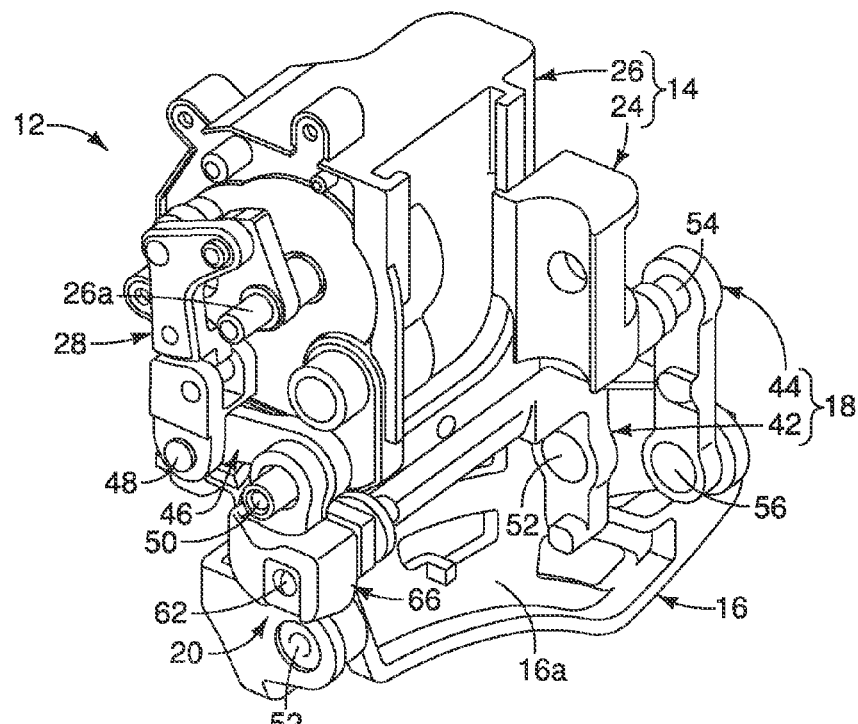
FIG. 2 is a front perspective view of the front derailleur illustrated in FIG. 1, but with the drive linkage cover removed to show the drive linkage.

As seen in FIG. 2, in the illustrated embodiment, the fixed member 14 includes a base member 24 and an electric motor unit 26. The electric motor unit 26 is fixedly mounted on the base member 24. The electric motor unit 26 is operatively connected to the support linkage 18 for moving the movable member 16 laterally with respect to the fixed member 14. The electric motor unit 26 includes a reversible electric motor that is electrically connected to a remote power supply such as a battery (not shown) and/or a generator (not shown) via an electrical cord (not shown). Alternatively, the electric motor unit 26 can be provided with a rechargeable battery (not shown).

As seen in FIG. 2, the electric motor unit 26 includes an output shaft 26a for driving the support linkage 18 to laterally move the movable member 16 with respect to the fixed member 14. In the illustrated embodiment, a drive linkage 28 connects the output shaft 26a to the support linkage 18. Thus, the movable member 16 is moved laterally by operation of the motor unit 26, which moves the drive linkage 28, which in turn moves the support linkage 18. In performing a chain shifting operation, the motor of the motor unit 26 is operated by a user operating device (not shown) to turn the output shaft 26a of the motor unit 26. Depending on the rotational direction of the output shaft 26a, the motor will either move the movable member 16 towards or away from the bicycle frame 10.

While the front derailleur 12 of the illustrated embodiment is an electric front derailleur, it will be apparent to those skilled in the art from this disclosure that the support linkage 18 can be operated by a cable (e.g., a Bowden cable) if desired. In other words, it will be apparent to those skilled in the art from this disclosure that electric the motor unit 26 of the front derailleur 12 can be replaced with a cable operated arrangement. Thus, the electric motor unit 26 and the drive linkage 28 will not be discussed in further detail herein.

Figure 3:
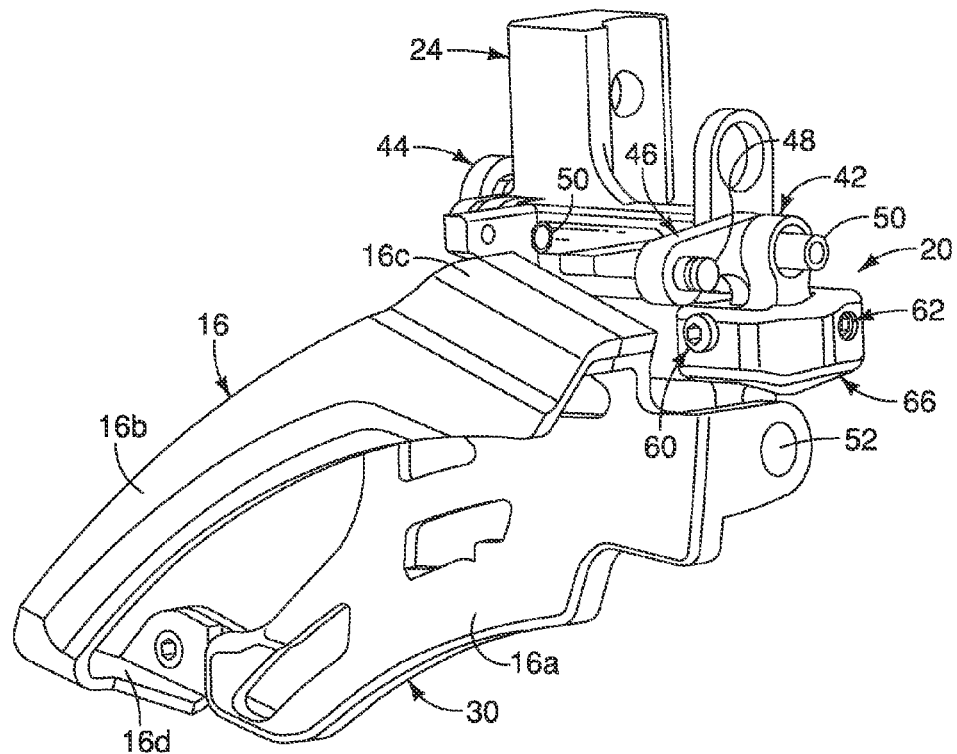
FIG. 3 is an outside perspective view of selected parts of the front derailleur illustrated in FIG. 1.
Figure 4:
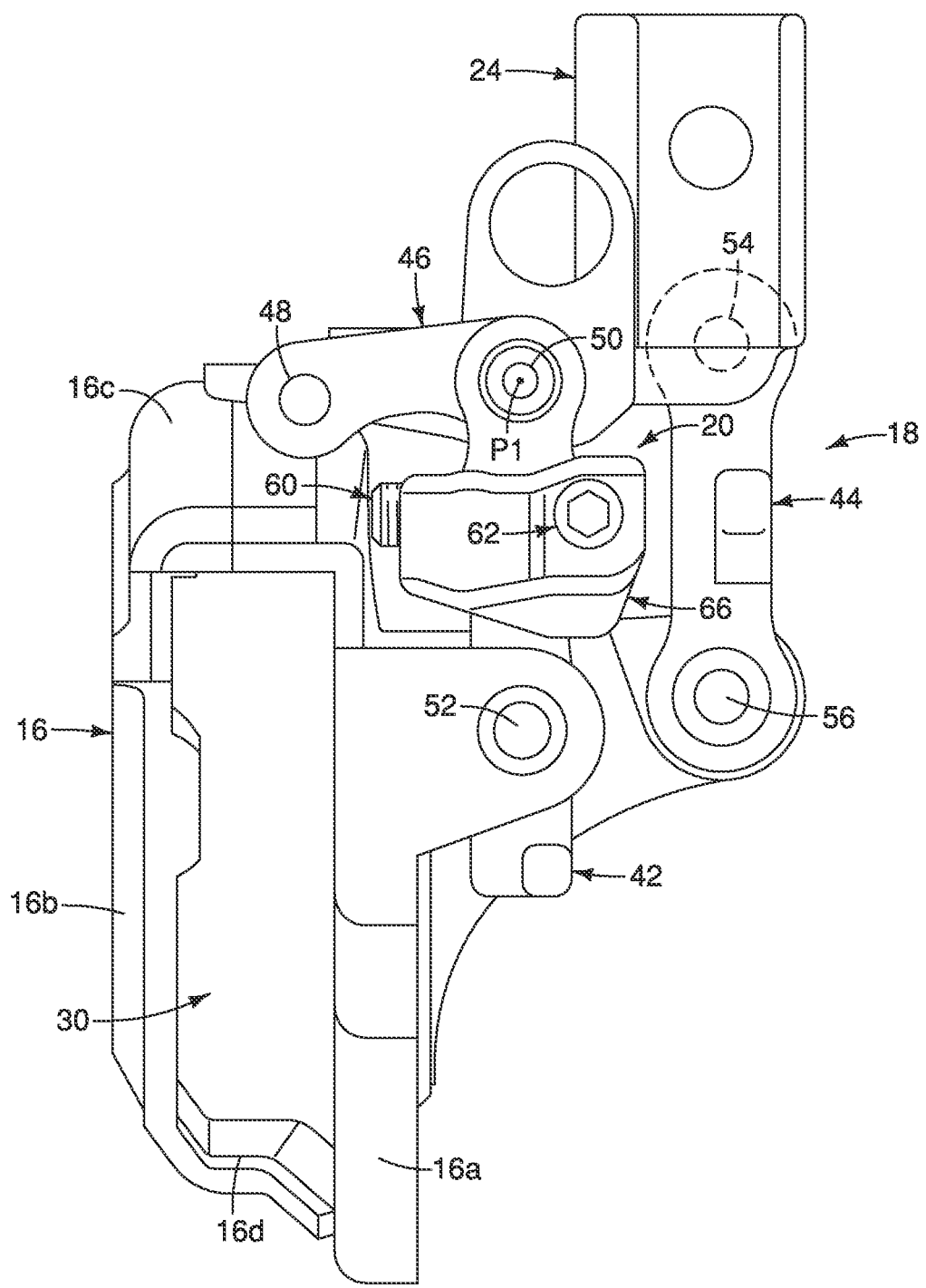
FIG. 4 is a front elevational view of the selected parts of the front derailleur illustrated in FIG. 3.

Referring to FIGS. 3 and 4, the movable member 16 basically includes an inner plate 16a, an outer plate 16b, a top connecting member 16c and a bottom connecting member 16d. The inner plate 16a and the outer plate 16b are laterally spaced apart and connected to each other at upper portions by the top connecting member 16c and connected to each other at lower portions by the bottom connecting member 16d to define a chain cage portion 30. The inner plate 16a pushes a chain up onto a larger chain ring during an upshift operation. The outer plate 16b pulls a chain inward onto a smaller chain ring during a downshift operation.

As seen FIGS. 2 and 4, the support linkage 18 includes a first link 42 movably connecting the movable member 16 to the fixed member 14. In the illustrated embodiment, the support linkage 18 further includes a second link 44 movably connecting the movable member 16 to the fixed member 14. The first and second links 42 and 44 are pivotally connected to the fixed member 14 and the movable member 16 to define a four bar linkage. As seen FIG. 4, the first link 42 is disposed between the chain cage portion 30 and the second link 44. Thus, in the illustrated embodiment, the first link 42 constitutes an outer link of the front derailleur 12, while the second link 44 constitutes an inner link of the front derailleur 12. While two links are used to support the movable member 16 to the fixed member 14, it will be apparent to those skilled in the art from this disclosure that the support linkage 18 can have only a single support link or can have more than two support links.

As seen in FIG. 2, a driven link 46 interconnects the support linkage 18 to the drive linkage 28. In particular, the driven link 46 is connected to the drive linkage 28 by a connecting pin 48. Thus, the output shaft 26a of the electric motor unit 26 is operatively coupled to the driven link 46 by the drive linkage 28 to move the movable member 16 laterally in response to operation of the motor unit 26.

Figure 5:
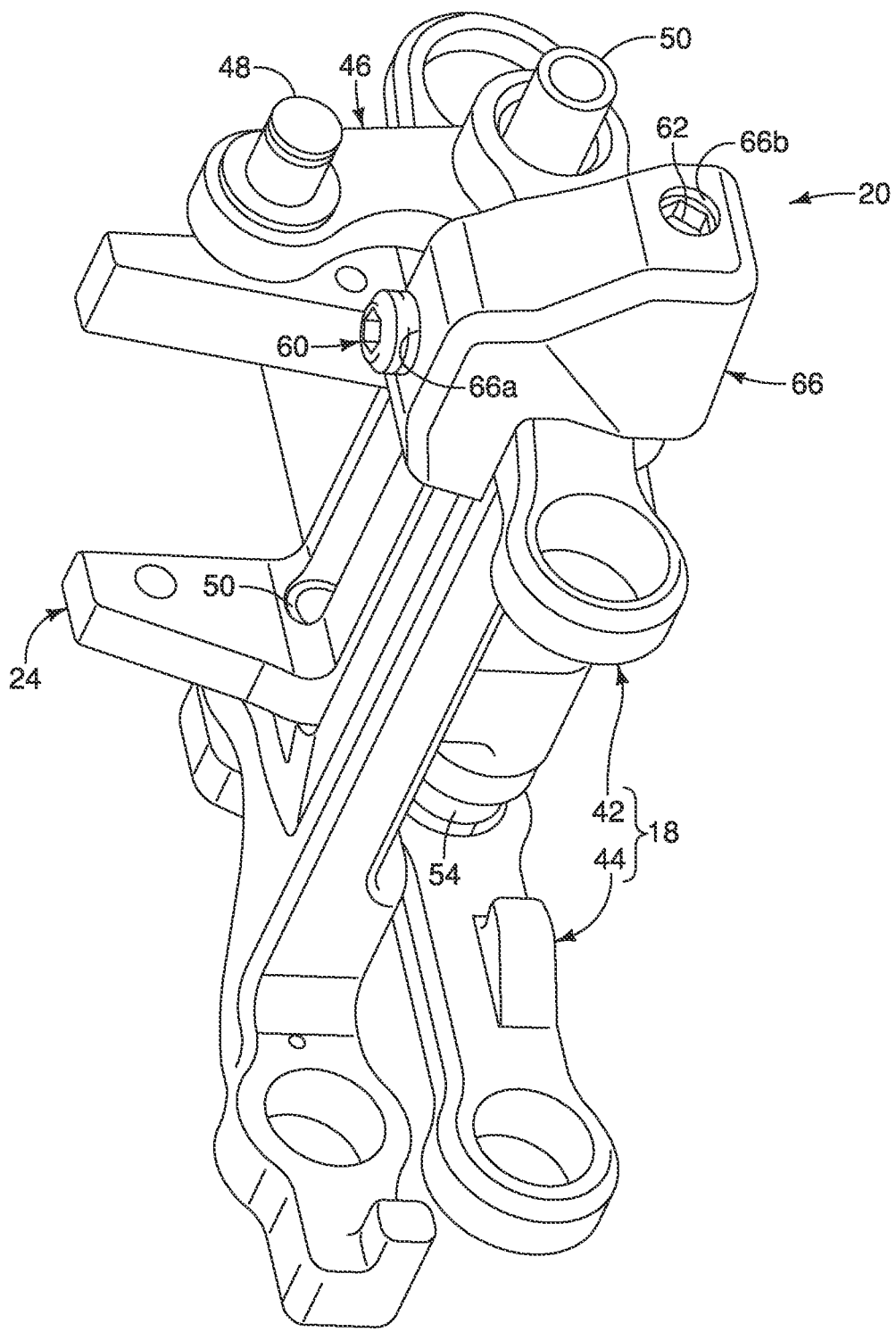
FIG. 5 is a bottom perspective view of the fixed member, the first and second links and the fixing structure of the front derailleur illustrated in FIG. 1.
Figure 6:
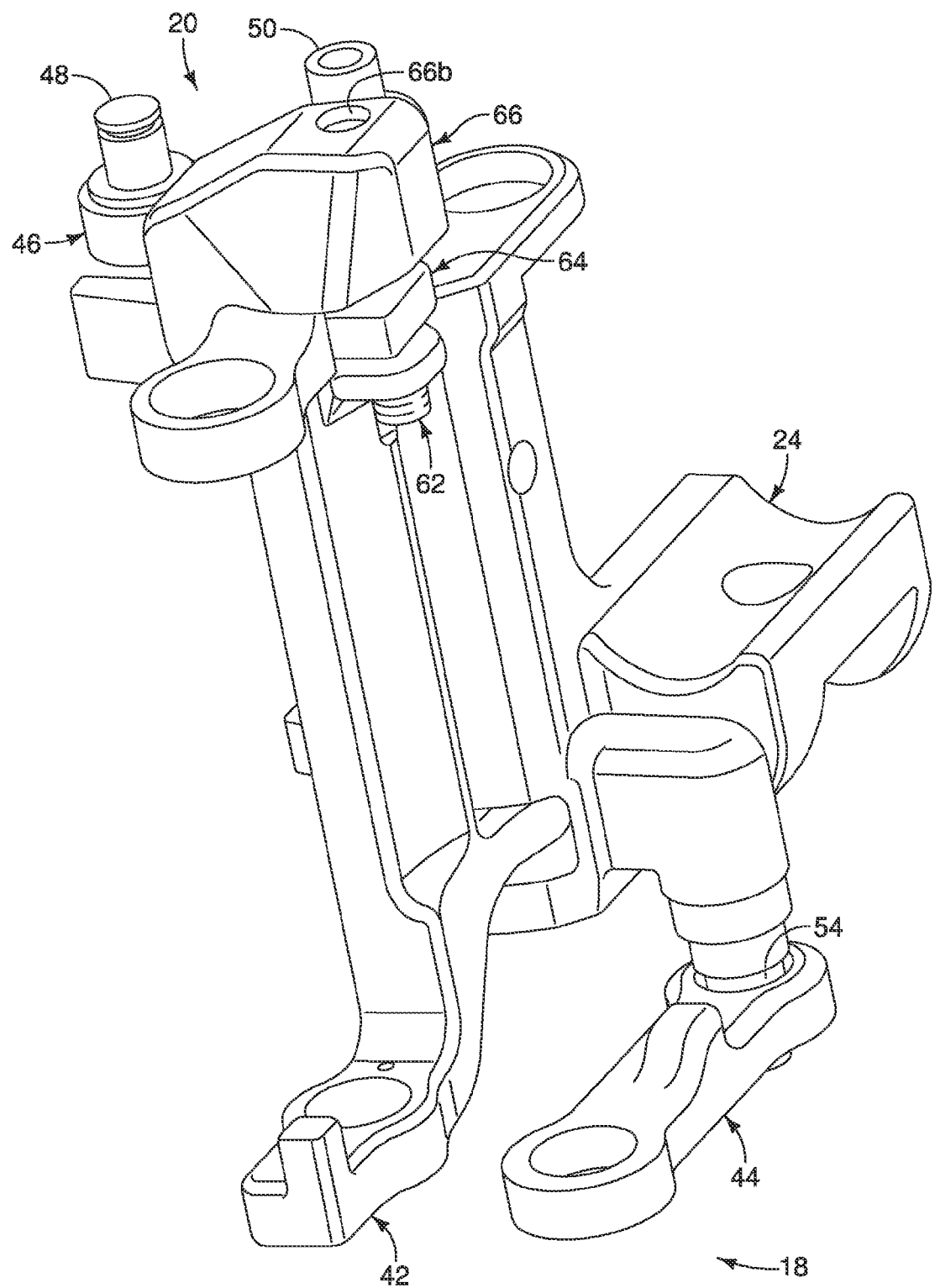
FIG. 6 is another bottom perspective view of the fixed member, the first and second links and the fixing structure illustrated in FIG. 5.

In illustrated embodiment, as seen in FIGS. 2, 5 and 6, the first link 42 is a wide H-shaped link that has a pair of first (upper) ends pivotally coupled to the base member 24 by a pair of pivot pins 50 respectively, and a pair of second (lower) ends pivotally coupled to the movable member 16 by a pair of pivot pins 52 respectively. The second link 44 has a first (upper) end pivotally coupled to the base member 24 by a pivot pin 54, and a second (lower) end pivotally coupled to the movable member 16 by a pivot pin 56. The driven link 46 is pivotally coupled to the base member 24 by the front one of the pivot pins 50. Thus, as seen in FIG. 4, the first 42 and the driven link 46 are pivotally mounted on the fixed member 14 about a single pivot axis P1, which is defined by the pivot pins 50.

Now, the fixing structure 20 will be discussed in more detail with reference mainly to FIGS. 4 to 15. Basically, the fixing structure 20 fixes a relative position of the first link 42 with respect to the base member 24 of the fixed member 14 to establish a fixed rest position of the movable member 16 with respect to the fixed member 14. More specifically, the fixing structure 20 adjustably connects the first link 42 to the driven link 46 in a fixed position. Thus, the driven link 46 is operatively coupled to the movable member 16 by the fixing structure 20 and the first link 42 such that a driving force a pushing or pulling force) is transmitted from the driven link 46 to the first link 42. In this way, the movable member 16 is moved laterally as the driven link 46 pivots about the pivot axis P1 in response to operation of the electric motor unit 26.

As best seen in FIGS. 6, 11, and 13 to 15, the fixing structure 20 basically includes a first bolt 60, a second bolt 62 and a movable abutment member 64. The first bolt 60, the second bolt 62 and the movable abutment member 64 cooperate together to selectively maintain a desired relative position of the first link 42 with respect to the driven link 46. The first bolt 60 has a threaded shaft 60a, a tool engagement structure 60b at one end of the threaded shaft 60a, and an abutment surface 60c at the other end of the threaded shaft 60a. The second bolt 62 has a threaded shaft 62a and a tool engagement structure 62b at one end of the threaded shaft 60a. The movable abutment member 64 has a threaded hole 64a and an inclined contact surface 64b.

Figure 7:
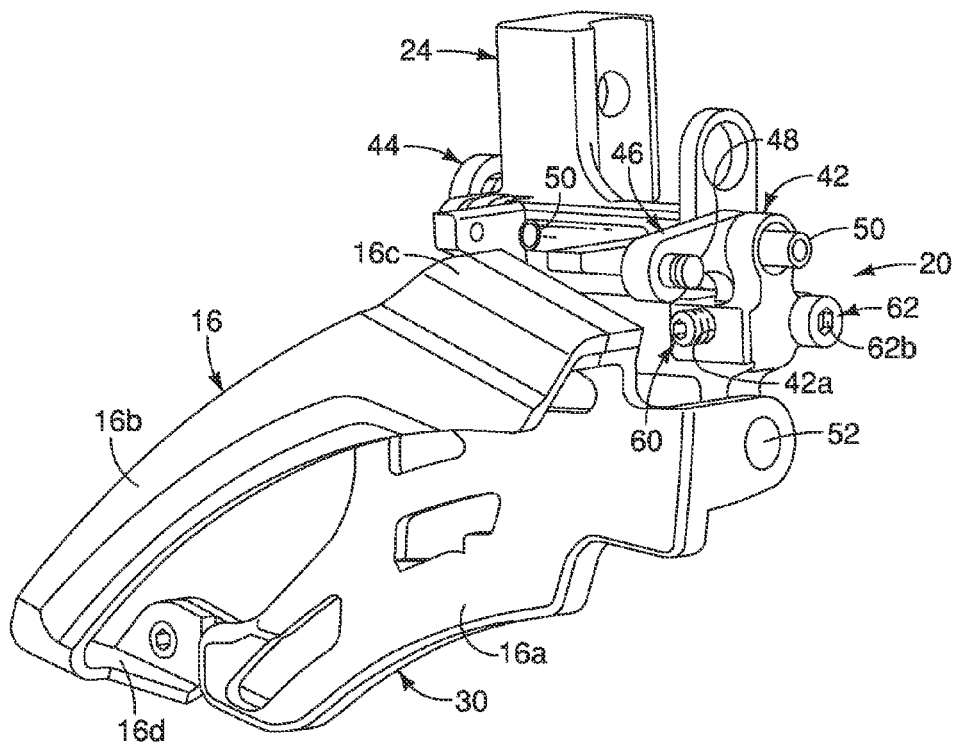
FIG. 7 is an outside perspective view of selected parts of the front derailleur illustrated in FIG. 1.
Figure 8:
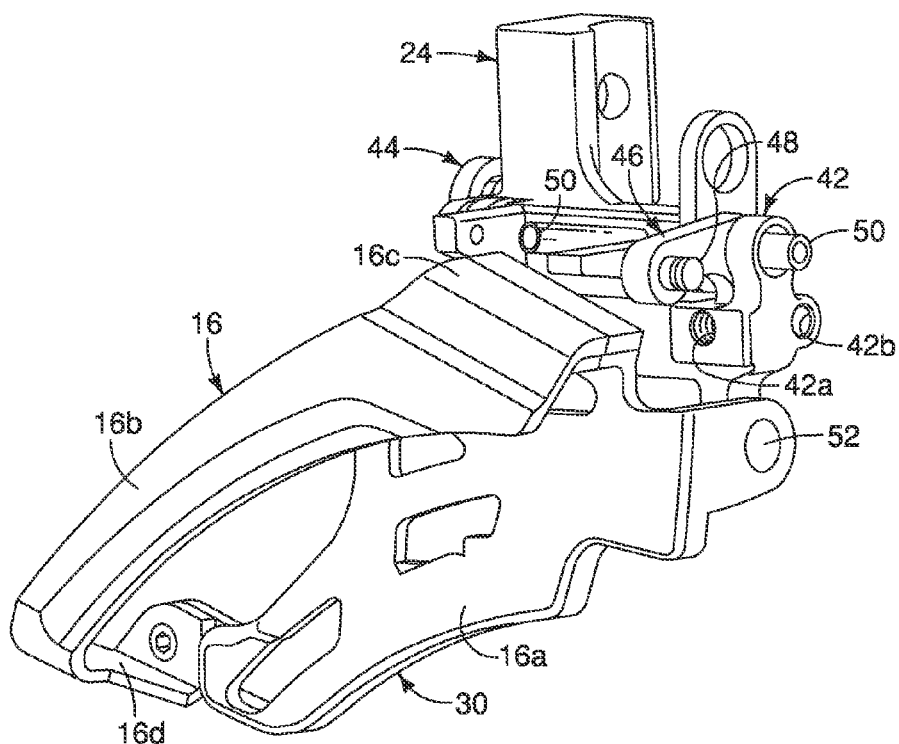
FIG. 8 is another outside perspective view of selected parts of the front derailleur illustrated in FIG. 1.
Figure 11:
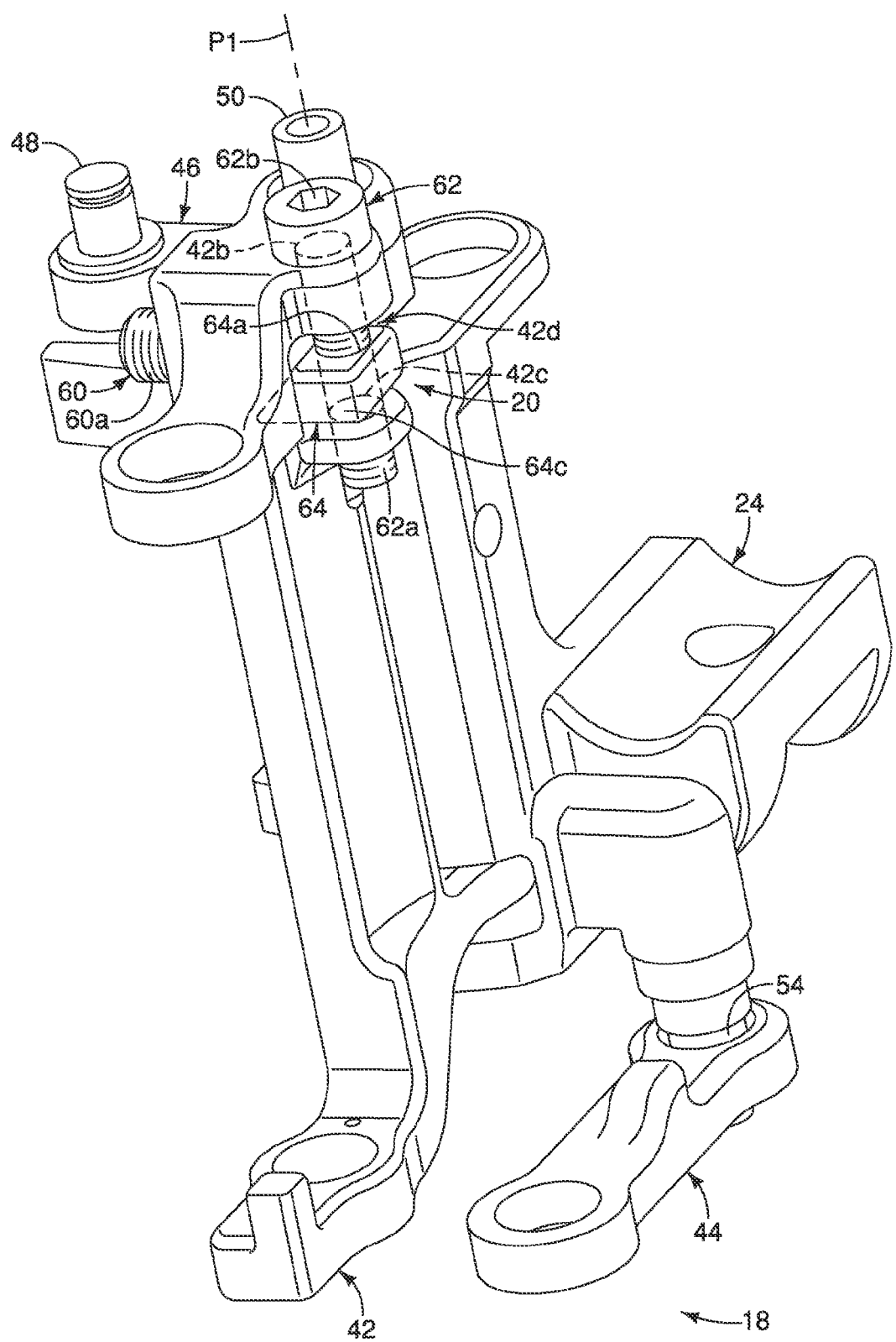
FIG. 11 is another bottom perspective view of the selected parts of the front derailleur illustrated in FIGS. 7, 9 and 10.
Figure 12:
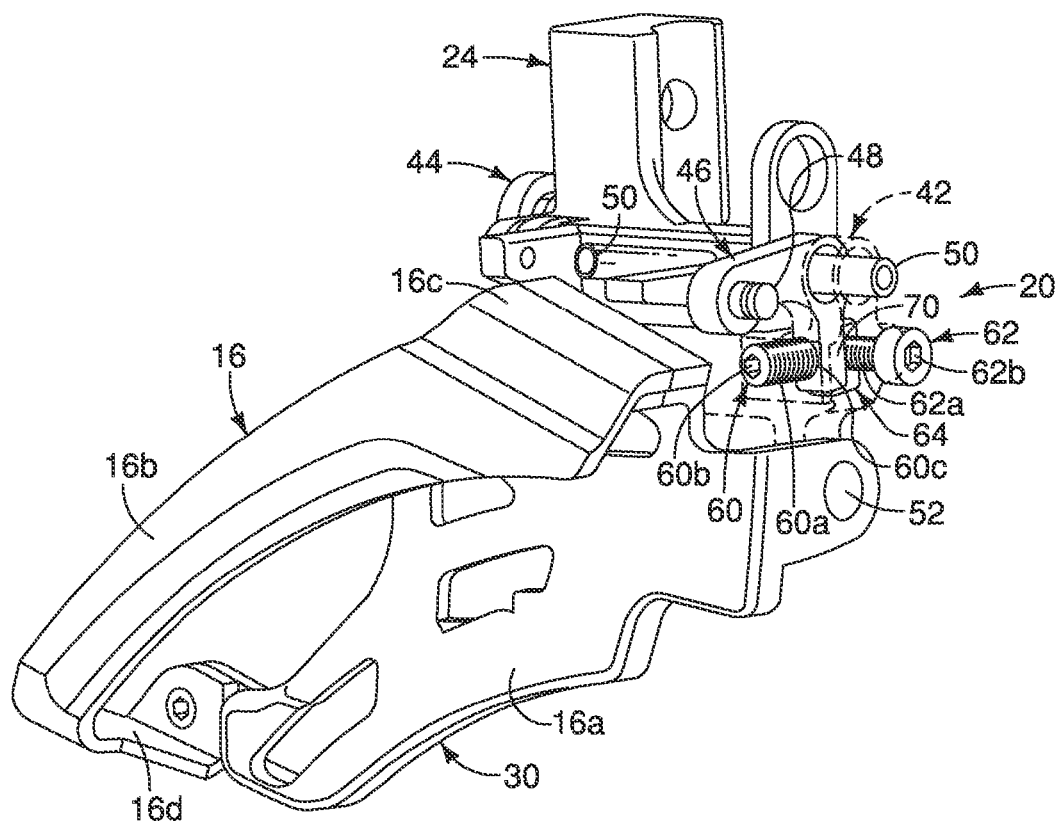
FIG. 12 is another outside perspective view of selected parts of the front derailleur illustrated in FIG. 1.
Figure 13:
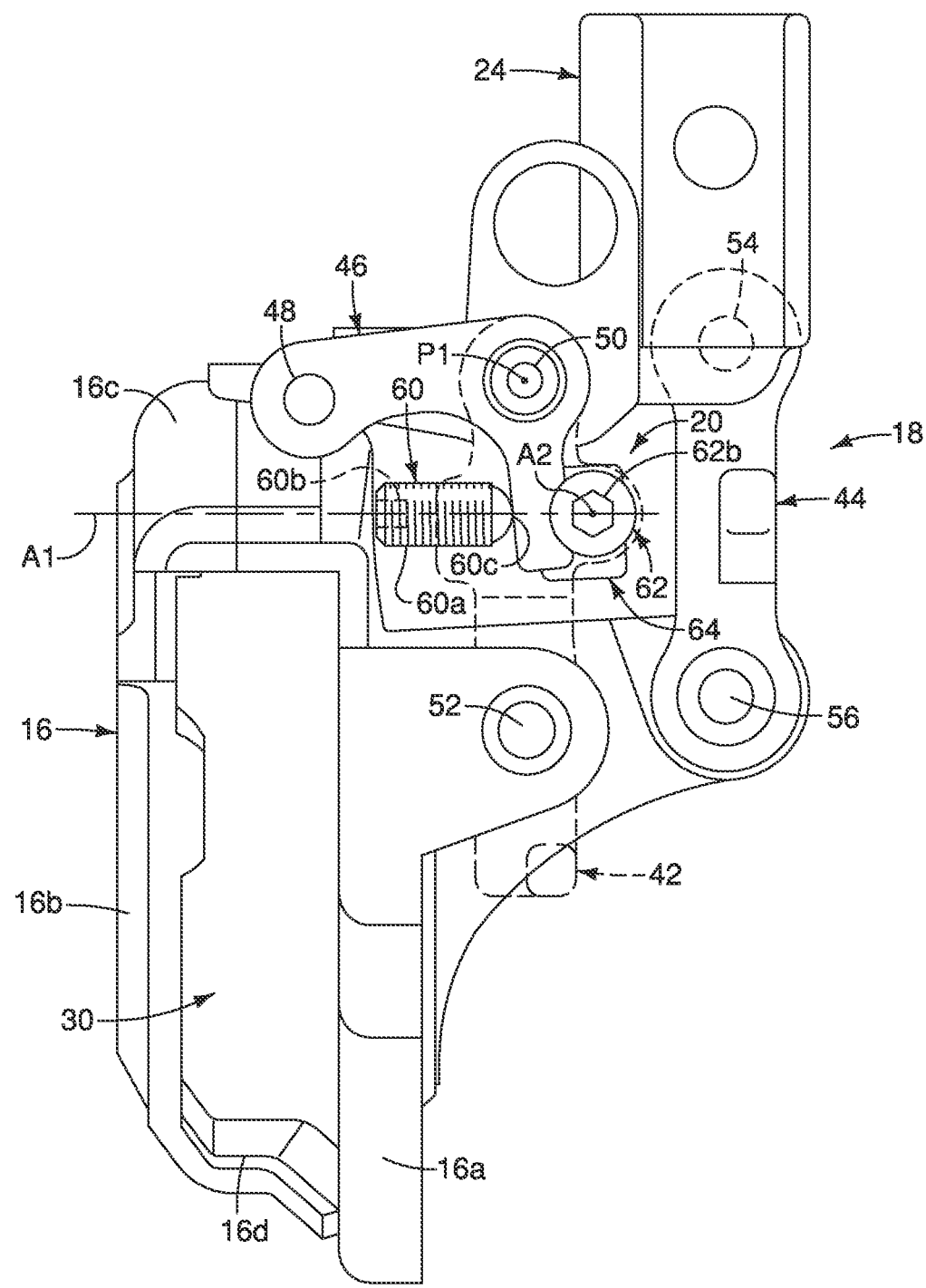
FIG. 13 is a front elevational view of the selected parts of the front derailleur illustrated in FIG. 12.
Figure 14:
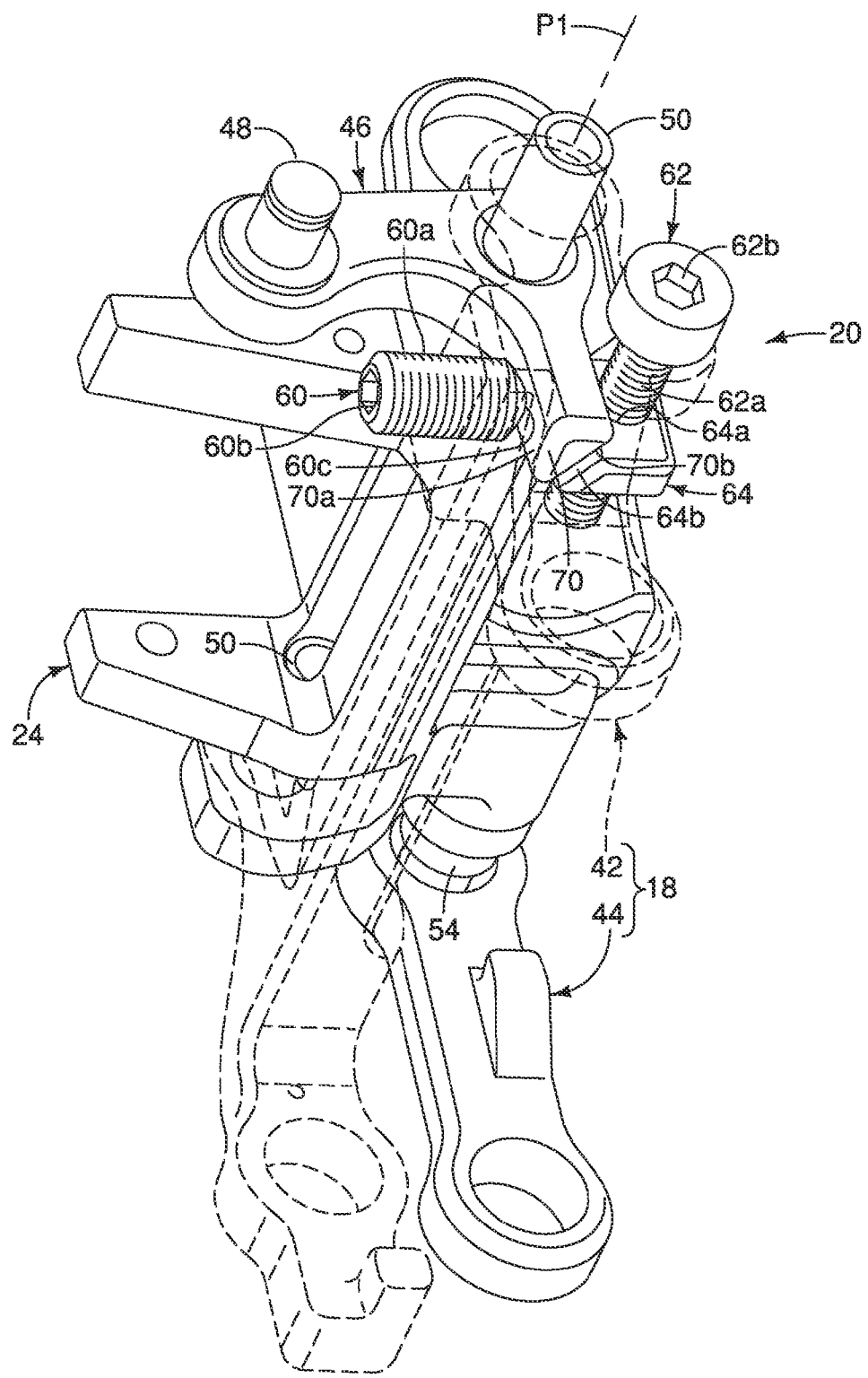
FIG. 14 is a bottom perspective view of the selected parts of the front derailleur illustrated in FIGS. 12 and 13.
Figure 15:
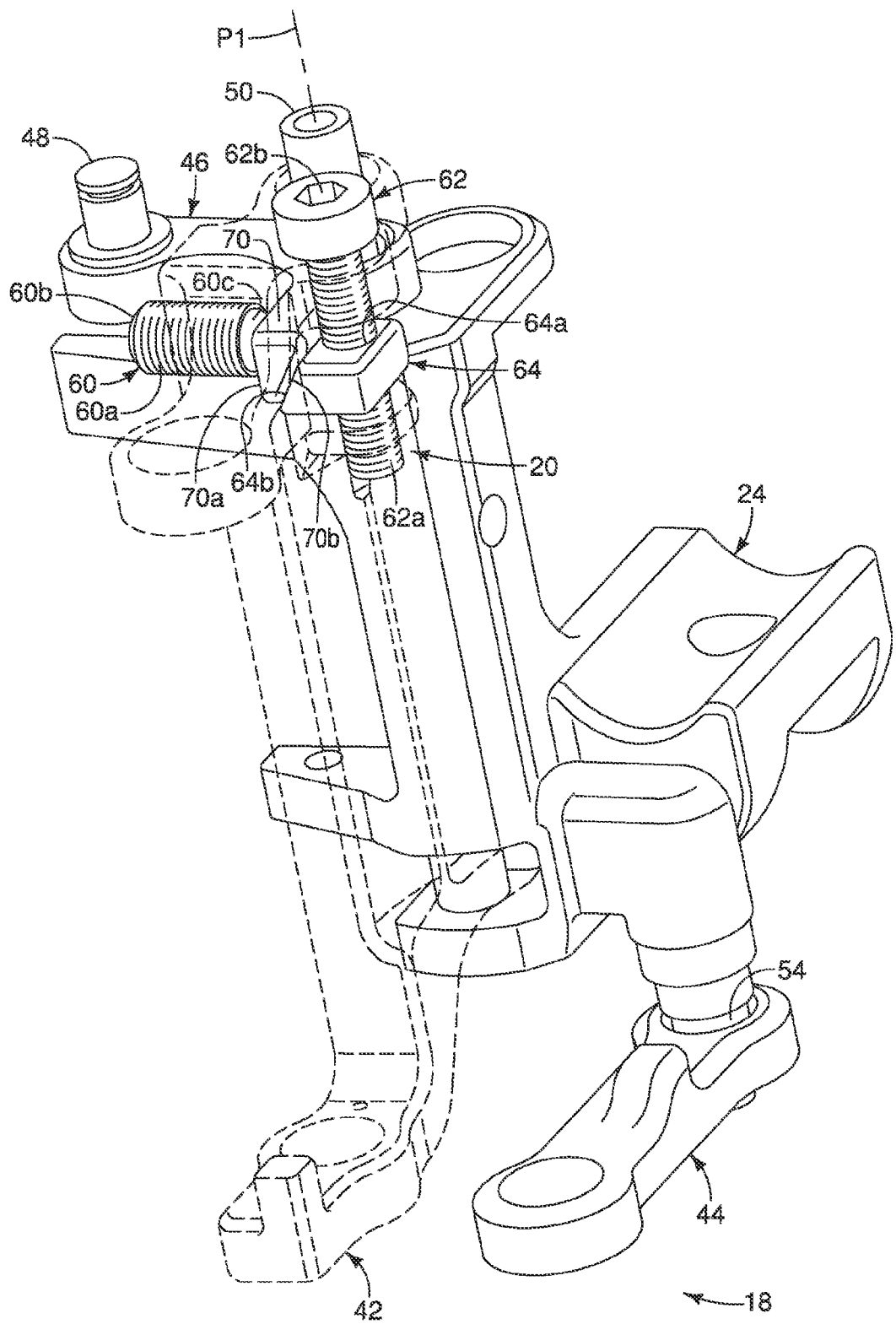
FIG. 15 is another bottom perspective view of the selected parts of the front derailleur illustrated in FIGS. 12, 13 and 14.

In the illustrated embodiment, as seen in FIGS. 7 and 8, the first bolt 60 is screwed into a threaded hole 42a of the first link 42. The second bolt 62 is supported on the first link 42 by a pair of mounting openings 42b and 42c as best seen in FIG. 11. As seen in FIGS. 11, 14 and 15, the movable abutment member 64 is threaded onto the threaded shaft 62a of the second bolt 62. The second bolt 62 is mounted on the first link 42 by the movable abutment member 64. More specifically, the movable abutment member 64 is located in the recess 42d (FIG. 11) of the first link 42 and the second bolt 62 is screwed into the threaded hole 64a of the movable abutment member 64 so that the second bolt 62 is retained on the first link 42. Also a lower surface 64c of the abutment member 64 contacts the first link 42 to prevent the movable abutment member 64 from rotating relative to the first link. 42 while the second bolt 62 is turned. Moreover, when the second bolt 62 is turned, the inclined contact surface 64b moves within the recess 42d and contacts the driven link 46, as discussed below, to pivot the driven link 46 on the front one of the pivot pins 50.

As seen in FIGS. 4 to 6, optionally, the fixing structure 20 also includes a cover member 66 that partially conceals the first bolt 60, the second bolt 62 and the movable abutment member 64. The cover member 66 is secured to the first link 42 by the first bolt 60, which screws into a threaded hole 66a of the cover member 66. The cover member 66 has a hole 66b that is aligned with the tool engagement structure 62b of the second bolt 62.

While the fixing structure 20 is mounted on the first link 42 in the illustrated embodiment, it will be apparent to those skilled in the art from this disclosure that the fixing structure 20 could be mounted on the driven link 46 if needed and/or desired. In other words, the first bolt 60 can be screwed into either one of the first link 42 and the driven link 46, and abuts the other of the first link 42 and the driven link 46. The second bolt 62 would be mounted on the one of the first link 42 and the driven link 46 with the movable abutment member 64 abutting the other of the first link 42 and the driven link 46. In both cases, the relative positions of the first link 42 and the driven link 46 can be easily adjusted to set the fixed rest position of the movable member 16.

In the illustrated embodiment, as seen in FIGS. 7 and 8, the first bolt 60 is screwed into the threaded hole 42a of the first link 42 and the second bolt 62 is mounted on the first link 42. As best seen in FIGS. 14 and 15, the abutment surface 60c of the first bolt 60 abuts the driven link 46 and the movable abutment member 64 abuts the driven link 46. In other words, the first bolt 60 and the movable abutment member 64 of the fixing structure 20 abut opposite circumferentially facing sides of the driven link 46 with respect to the pivot axis P1 to establish the fixed rest position of the movable member 16.

Figure 9:
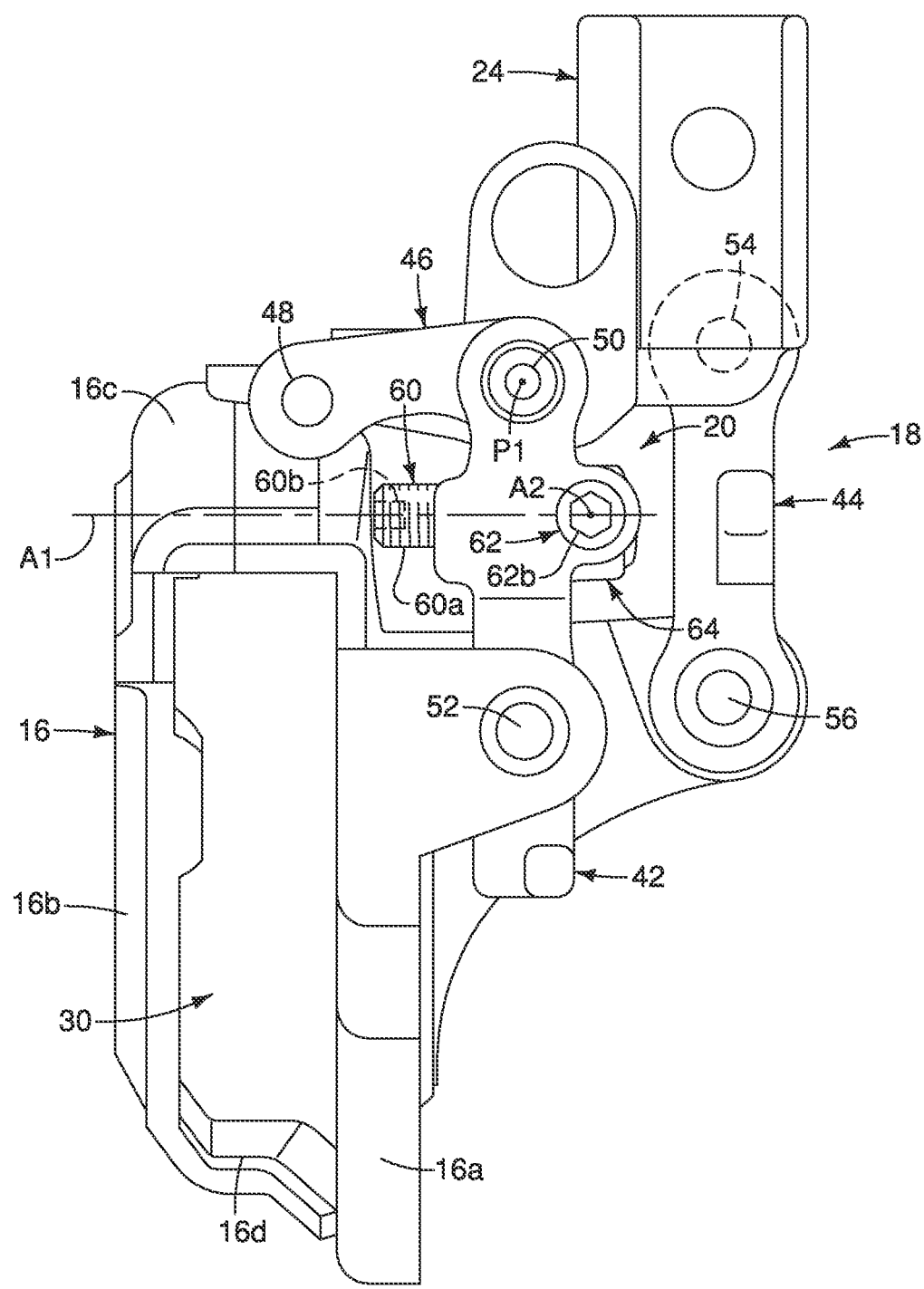
FIG. 9 is a front elevational view of the selected parts of the front derailleur illustrated in FIG. 7.
Figure 10:
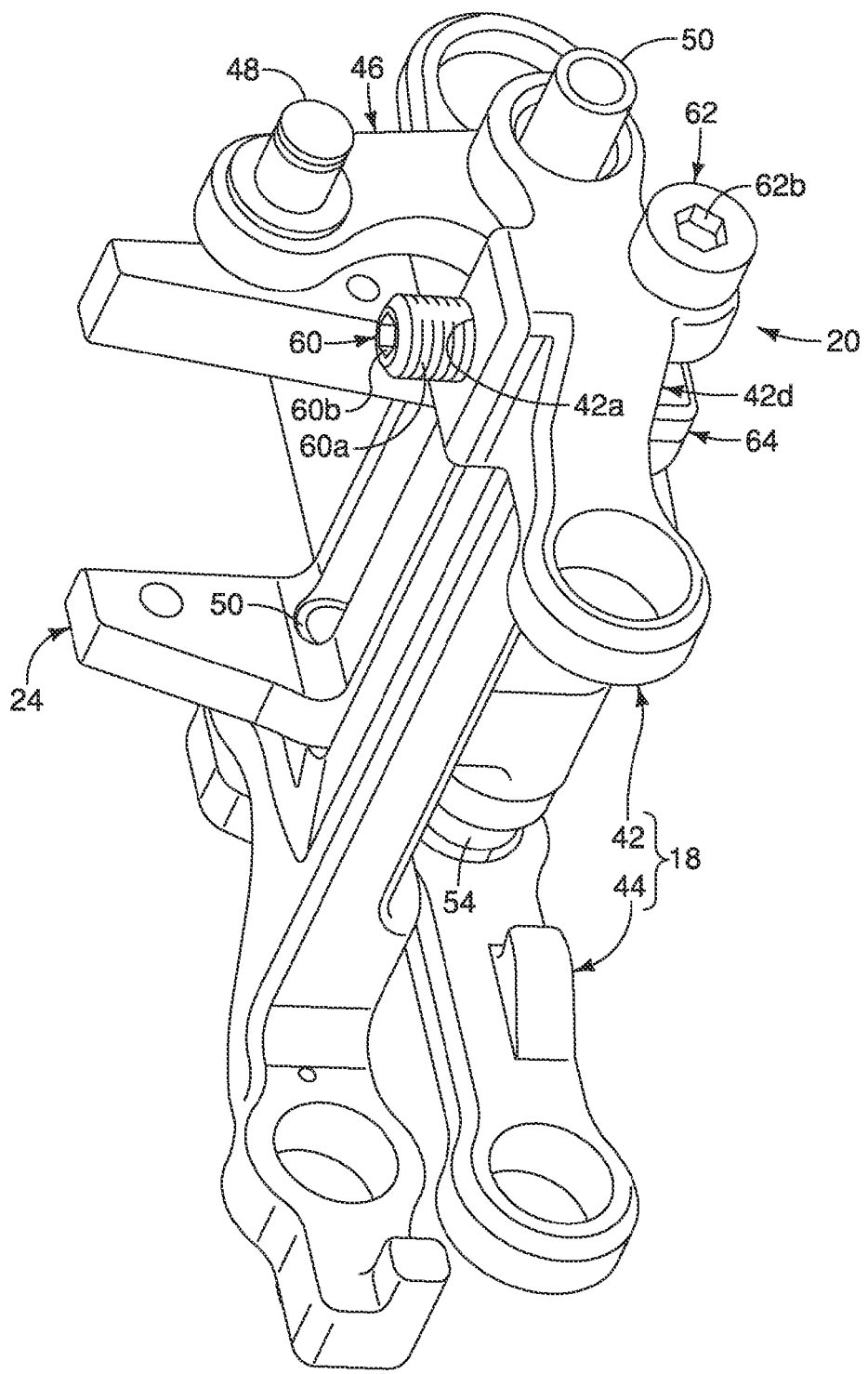
FIG. 10 is a bottom perspective view of the selected parts of the front derailleur illustrated in FIGS. 7 and 9.

As seen in FIG. 9, the first and second bolts 60 and 62 are mounted on the first link 42, such that the first bolt 60 has a longitudinal screwing axis A1 that is perpendicularly arranged relative to a longitudinal screwing axis A2 of the second bolt 62. As seen in FIGS. 11 and 14, the movable abutment member 64 is threaded onto a threaded shaft portion of the second bolt 62. In other words, the threaded shaft of the second bolt 62 is threaded into the movable abutment member 64. Thus, as the second bolt 62 is turned about the screwing axis A2 (FIG. 9), the movable abutment member 64 moves axially along the threaded shaft 62a of the second bolt 62 and that abuts the other of the first link 42 and the driven link. 46 as the second bolt 62 is turned about the screwing axis A2.

In particular, as seen in FIGS. 12 to 15, the driven link 46 includes a projecting part 70 that is sandwiched in between the first bolt 60 and the movable abutment member 64. By turning the first and second bolt 60 and 62, the position of the first link 42 with respect to the driven link 46 can be adjusted, as explained below, such that the fixed rest position of the movable member 16 with respect to the fixed member 14 is adjusted. The projecting part 70 of the driven link 46 includes an abutment surface 70a and an inclined contact surface 70b. The abutment surface 60c of the first bolt 60 contacts the abutment surface 70a of the driven link 46 to prevent movement of the driven link 46 in a clockwise direction about the pivot axis P1 as viewed from in front of the front derailleur 12 (i.e., as seen in FIG. 4). On the other hand, the inclined contact surface 64b of the movable abutment member 64 contacts the inclined contact surface 70b to prevent movement of the driven link 46 in a counterclockwise direction about the pivot axis P1 as viewed from in front of the front derailleur 12 (i.e., as seen in FIG. 4). The inclined contact surface 70b inclines with respect to the screwing axis A2 of the second bolt 62. The inclined contact surface 64b of the movable abutment member 64 inclines with respect to the screwing axis A2 of the second bolt 62 so as to face and contact the inclined contact surface 70b to prevent movement of the driven link 46 the counterclockwise direction about the pivot axis P1 as seen in FIG. 4. In this embodiment, the inclined contact surface 70b corresponds to the first inclined contact surface of claims and the inclined contact surface 64b corresponds to the second inclined contact surface of claims.

Figure 16:
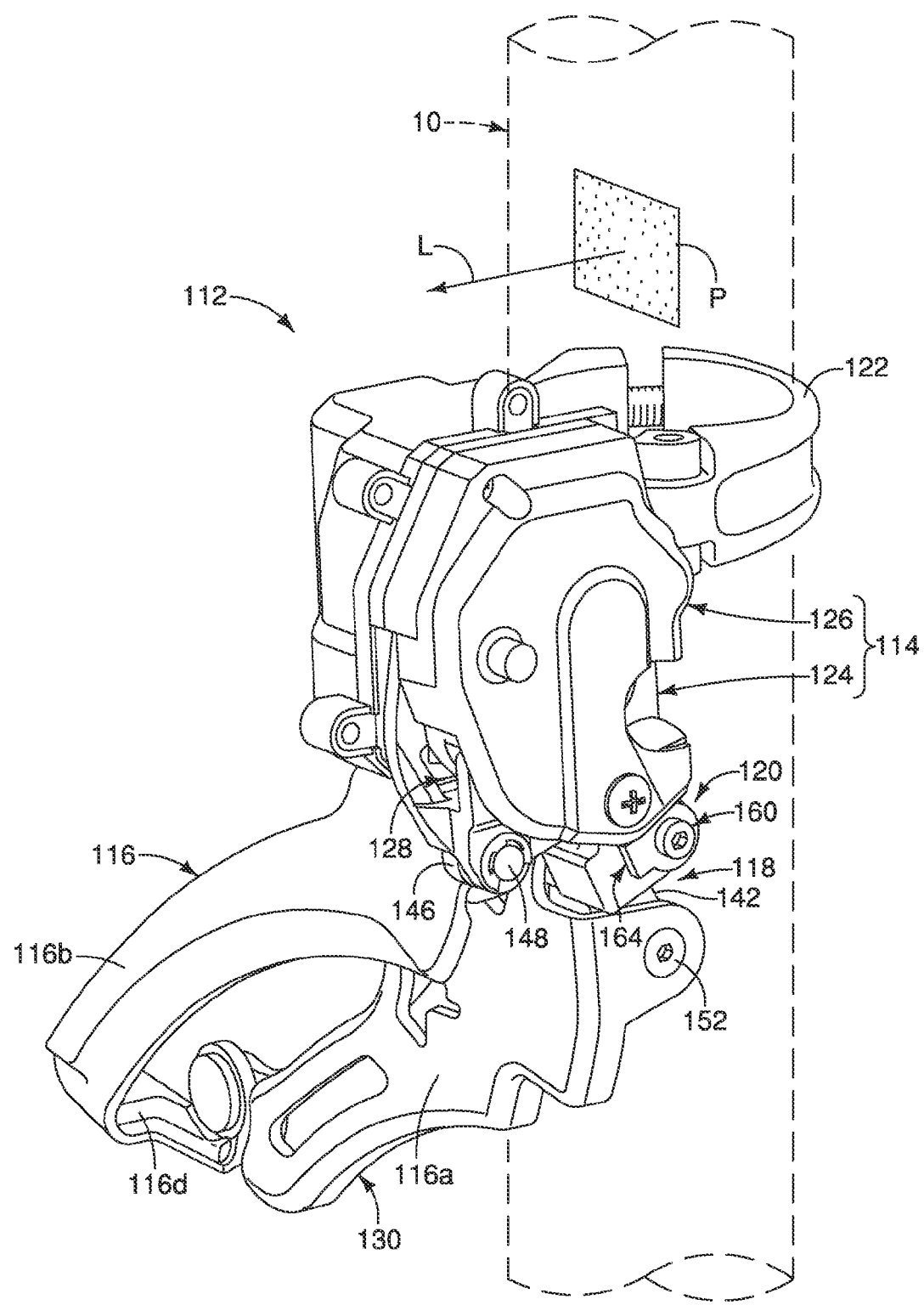
FIG. 16 is a partial side perspective view of a portion of a bicycle frame having a front derailleur in accordance with a second embodiment.

Now, one method of adjusting (setting) the fixed rest position of the movable member 16 with respect to the fixed member 14 will now be discussed. Of course, the following order of some of the steps can be changed as needed and/or desired. First, the first bolt 60 is screwed into the threaded hole 42a of the first link 42. Next, the second bolt 62 is mounted on the first link 42 using the movable abutment member 64. The movable abutment member 64 is inserted into the recess 42d (FIG. 11) of the first link 42 such that the inclined contact surface 70b of the projecting part 70 of the driven link 46 can mate with the inclined contact surface 64b of the movable abutment member 64 as seen in FIGS. 14 and 16. Now, the threaded shaft 62a of the second bolt 62 is inserted into the opening 42b and screwed into the threaded hole 64a of the movable abutment member 64, which is located in the recess 42d (FIG. 11) of the first link 42 until the free end of the threaded shaft 62a of the second bolt 62 is located in the opening 42c as seen in FIG. 11. Thus, the second bolt 62 is now supported in the opening 42b and 42c with the movable abutment member 64 located in the recess 42d.

Now the first bolt 60 is turned to advance or retract the first bolt 60 relative to the abutment surface 70a of the projecting part 70 of the driven link 46 until the desired position of the movable member 16 is attained. The second bolt 62 is then turned to move the movable abutment member 64 axially along the threaded shaft 62a of the second bolt 62 until the inclined contact surface 70b of the projecting part 70 contacts the inclined contact surface 64b of the movable abutment member 64. Thus, the projecting part 70 is now sandwiched in between the first bolt 60 and the movable abutment member 64. Thus, a fixed connection between the first link 42 and the driven link 46 is established. Further adjustment can be attained as needed and/or desired by turning one of the first and second bolts 60 and 62 to loosening the connection between the first link 42 and the driven link 46 and then turning the other of the first and second bolts 60 and 62 to tighten the connection between the first link 42 and the driven link 46.

Referring now to FIGS. 16 to 27, a front derailleur 112 is illustrated in accordance with a second embodiment. The front derailleur 112 is attached to the bicycle frame 10 in the same manner as the first embodiment. As seen in FIG. 16, the front derailleur 112 basically includes a fixed member 114, a movable member 116 (e.g., a chain guide) and a support linkage 118. The front derailleur 112 further includes a fixing structure 120 that is operatively coupled to the support linkage 118 to establish a fixed rest position of the movable member 116 with respect to the fixed member 114. The fixing structure 120 is configured to provide adjustment of a fixed rest position of the movable member 116 with respect to the fixed member 114 in the lateral direction L of the bicycle frame 10. Similar to the front derailleur 12, discussed above, the front derailleur 112 is configured such that the fixed rest position of the movable member 116 with respect to the fixed member 114 can be easily set between at least two different positions. Otherwise, the front derailleur 12 and the front derailleur 112 are substantially the same. In view of the similarities between the front derailleur 12 and the front derailleur 112, the following description will focus only the differences of the front derailleur 112 with respect to the front derailleur 12.

As seen in FIG. 16, the fixed member 114 is configured to be directly fixed to the bicycle frame 10 (e.g., seat tube) by a hinged type seat tube clamp 122. Thus, the fixed member 114 constitutes a mounting fixture for supporting the front derailleur 112 on the bicycle frame 10. In the illustrated embodiment, the seat tube clamp 122 is preferably detachable from the fixed member 114 by a bolt (not shown). However, the fixed member 114 can have other types of attachment structures as needed and/or desired. The movable member 116 is movably supported with respect to the fixed member 114 by the support linkage 118 so that the movable member 116 can move in the lateral direction L with respect to the vertical center plane P of the bicycle frame 10.

Figure 17:
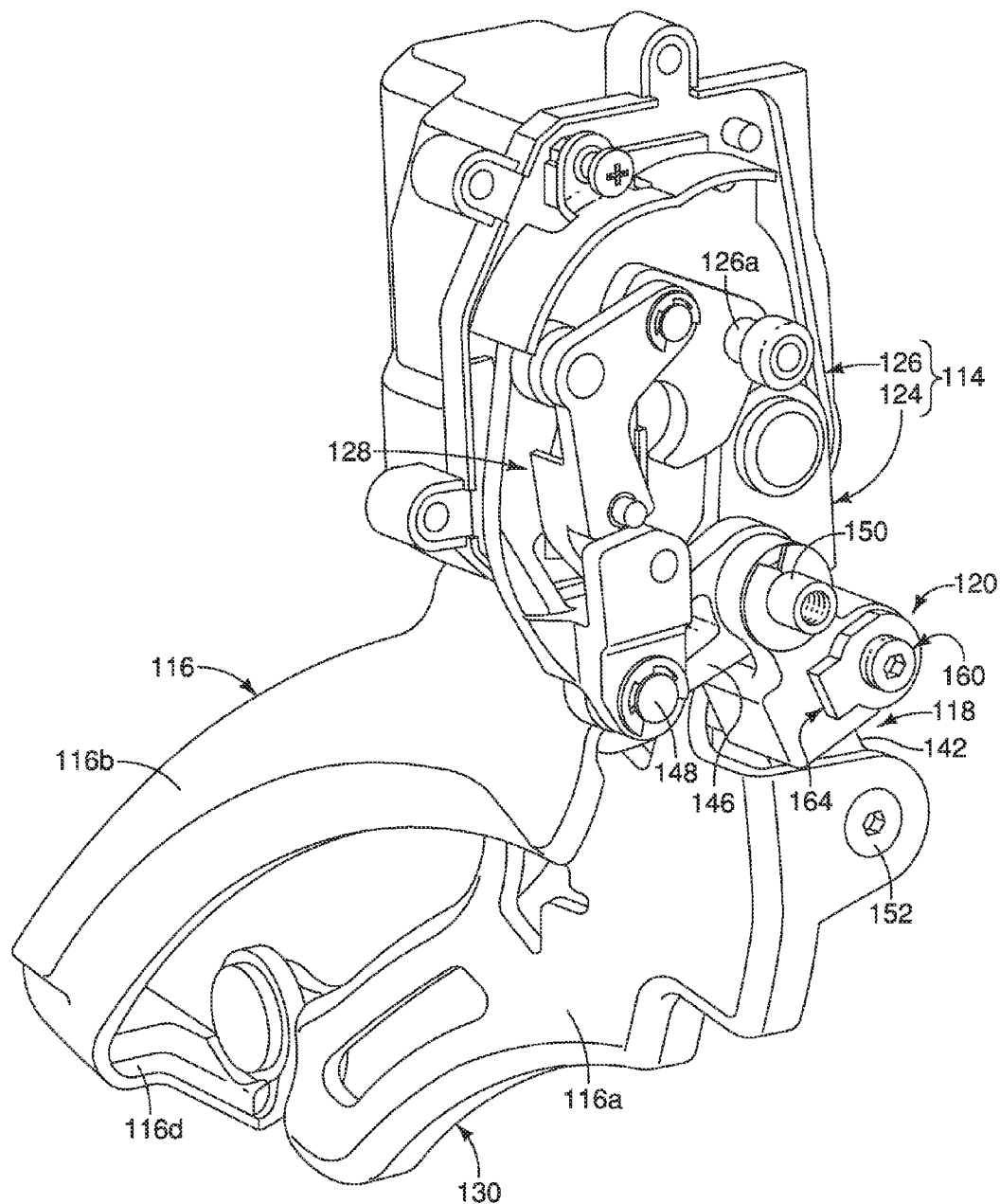
FIG. 17 is a front perspective view of the front derailleur illustrated in FIG. 16, but with the drive linkage cover removed to show the drive linkage.
Figure 18:
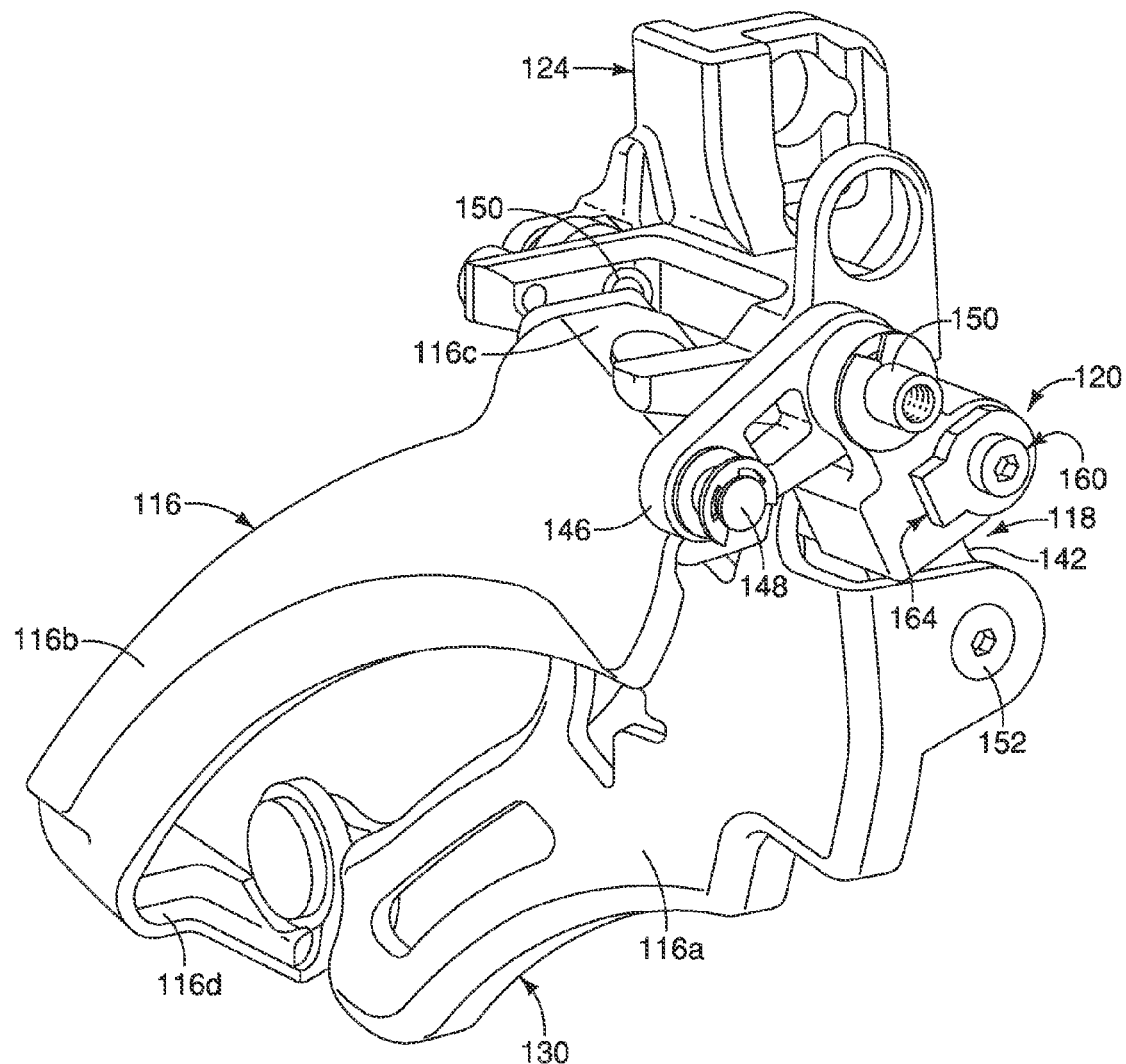
FIG. 18 is an outside perspective view of selected parts of the front derailleur illustrated in FIG. 16.

As seen in FIGS. 17 and 18, in the illustrated embodiment, the fixed member 114 includes a base member 124 (FIG. 18) and an electric motor unit 126 (FIG. 17). The electric motor unit 126 is fixedly mounted on the base member 124. The electric motor unit 126 is operatively connected to the support linkage 118 for moving the movable member 116 laterally with respect to the fixed member 114. The electric motor unit 126 includes a reversible electric motor that is electrically connected to a remote power supply such as a battery (not shown) and/or a generator (not shown) via an electrical cord (not shown). Alternatively, the electric motor unit 126 can be provided with a rechargeable battery (not shown).

As seen in FIG. 17, the electric motor unit 126 includes an output shaft 126a for driving the support linkage 118 to laterally move the movable member 116 with respect to the fixed member 114. In the illustrated embodiment, a drive linkage 128 connects the output shaft 126a to the support linkage 118. Thus, the movable member 116 is moved laterally by operation of the motor unit 126, which moves the drive linkage 128, which in turn moves the support linkage 118. In performing a chain shifting operation, the motor of the motor unit 126 is operated by a user operating device (not shown) to turn the output shaft 126a of the motor unit 126. Depending on the rotational direction of the output shaft 126a, the motor will either move the movable member 116 towards or away from the bicycle frame 10.

While the front derailleur 112 of the illustrated embodiment is an electric front derailleur, it will be apparent to those skilled in the art from this disclosure that the support linkage 118 can be operated by a cable (e.g., a Bowden cable) if desired. In other words, it will be apparent to those skilled in the art from this disclosure that electric the motor unit 126 of the front derailleur 112 can be replaced with a cable operated arrangement. Thus, the electric motor unit 126 and the drive linkage 128 will not be discussed in further detail herein.

Figure 19:
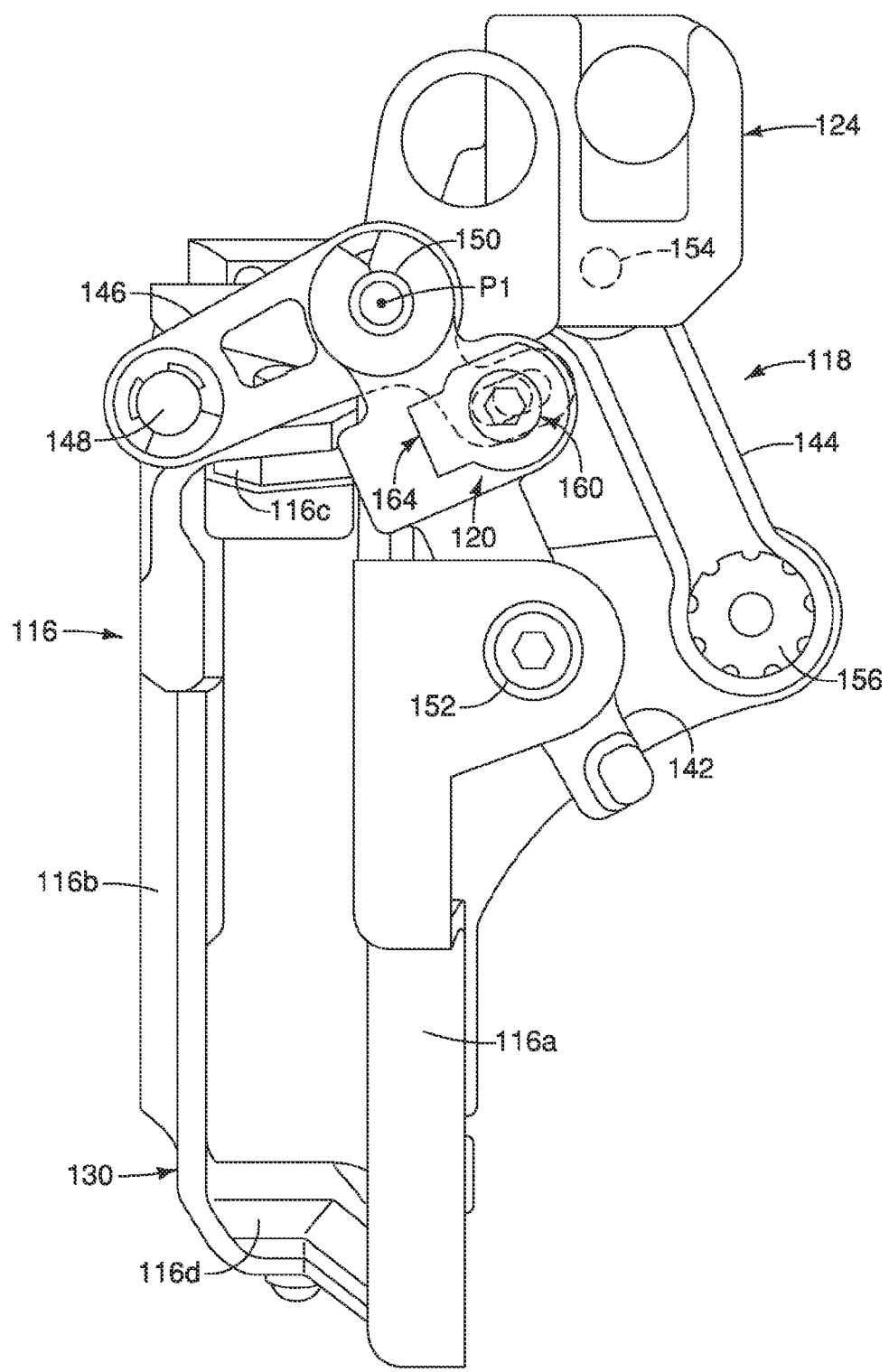
FIG. 19 is a front elevational view of the selected parts of the front derailleur illustrated in FIG. 18.

Referring to FIGS. 18 and 19, the movable member 116 basically includes an inner plate 116a, an outer plate 116b, a top connecting member 116c and a bottom connecting member 116d. The inner plate 116a and the outer plate 116b are laterally spaced apart and connected to each other at upper portions by the top connecting member 116c and connected to each other at lower portions by the bottom connecting member 116d to define a chain cage portion 130. The inner plate 116a pushes a chain up onto a larger chain ring during an upshift operation. The outer plate 116b pulls a chain inward onto a smaller chain ring during a downshift operation.

Figure 20:
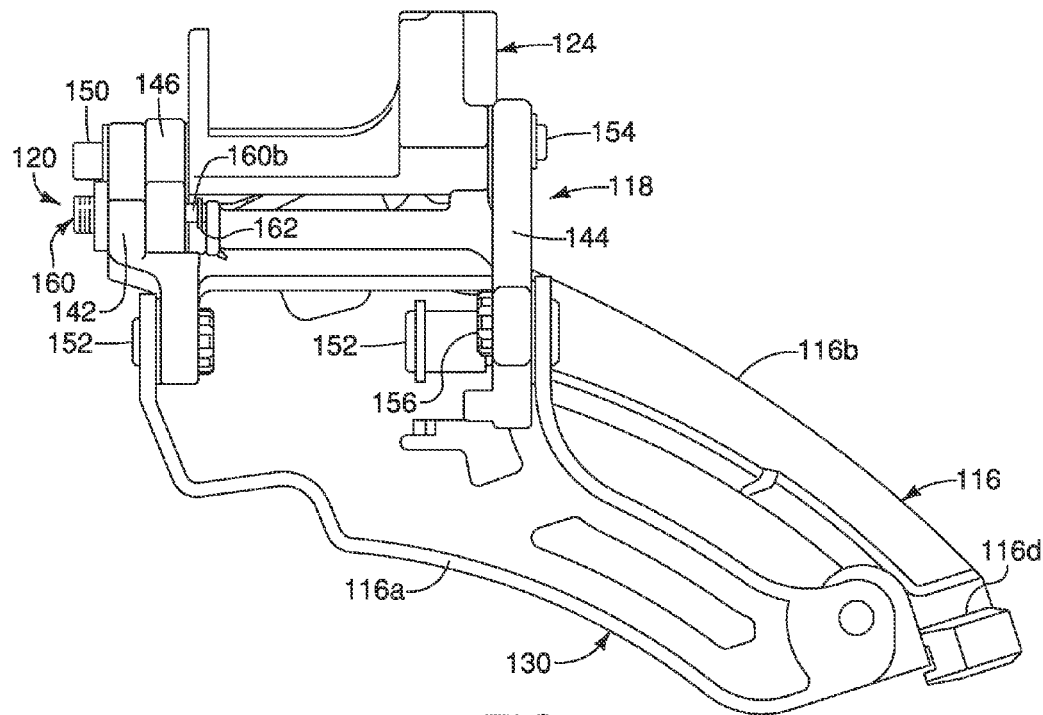
FIG. 20 is an inside elevational view of the selected parts of the front derailleur illustrated in FIGS. 18 and 19.

As seen FIGS. 18 to 20, the support linkage 118 of the front derailleur 112 includes a first link 142. The first link 142 movably connects the movable member 116 to the fixed member 114. In the illustrated embodiment, the support linkage 118 further includes a second link 144 movably connecting the movable member 116 to the fixed member 114. The first and second links 142 and 144 are pivotally connected to the fixed member 114 and the movable member 116 to define a four bar linkage. As seen FIG. 19, the first link 142 is disposed between the chain cage portion 130 and the second link 144. Thus, in the illustrated embodiment, the first link 142 constitutes an outer link of the front derailleur 112, while the second link 144 constitutes an inner link of the front derailleur 112. While two links are used to support the movable member 116 to the fixed member 114, it will be apparent to those skilled in the art from this disclosure that the support linkage 118 can have only a single support link or can have more than two support links.

As seen in FIG. 17, the support linkage 118 of the front derailleur 112 includes a driven link 146 that interconnects the support linkage 118 to the drive linkage 128. In particular, the driven link 146 is connected to the drive linkage 128 by a connecting pin 148. In this way, the driven link 146 is operatively coupled to the movable member 116. Thus, the output shaft 126a of the electric motor unit 126 is operatively coupled to the driven link 146 by the drive linkage 128 to move the movable member 116 laterally in response to operation of the motor unit 126.

In illustrated embodiment, as seen in FIGS. 18 to 20, the first link 142 is a wide H-shaped link that has a pair of first (upper) ends pivotally coupled to the base member 124 by a pair of pivot pins 150 respectively, and a pair of second (lower) ends pivotally coupled to the movable member 116 by a pair of pivot pins 152 respectively. The second link 144 has a first (upper) end pivotally coupled to the base member 124 by a pivot pin 154, and a second (lower) end pivotally coupled to the movable member 116 by a pivot pin 156. The driven link 146 is pivotally coupled to the base member 124 by the front one of the pivot pins 150. Thus, as seen in FIG. 19, the first link 142 and the driven link 146 are pivotally mounted on the fixed member 114 about a single pivot axis P1, which is defined by the pivot pins 150.

Now, the fixing structure 20 will be discussed in more detail with reference mainly to FIGS. 21 to 27. Basically, the first link 142 is adjustably coupled to the driven link 146 in a fixed position by the fixing structure 120 to establish a fixed rest position of the movable member 116 with respect to the fixed member 114. In other words, the fixing structure 120 fixes a relative position of the first link 142 with respect to the base member 124 of the fixed member 114 to establish a fixed rest position of the movable member 116 with respect to the fixed member 114. More specifically, the fixing structure 120 adjustably connects the first link 142 to the driven link 146 in a fixed position. Thus, the driven link 146 is operatively coupled to the movable member 116 by the fixing structure 120 and the first link 142 such that a driving force (a pushing or pulling force is transmitted from the driven link 146 to the movable member 116 via the first link 142. In this way, the movable member 116 is moved laterally as the driven link 146 pivots about the pivot axis P1 in response to operation of the electric motor unit 126.

Figure 21:
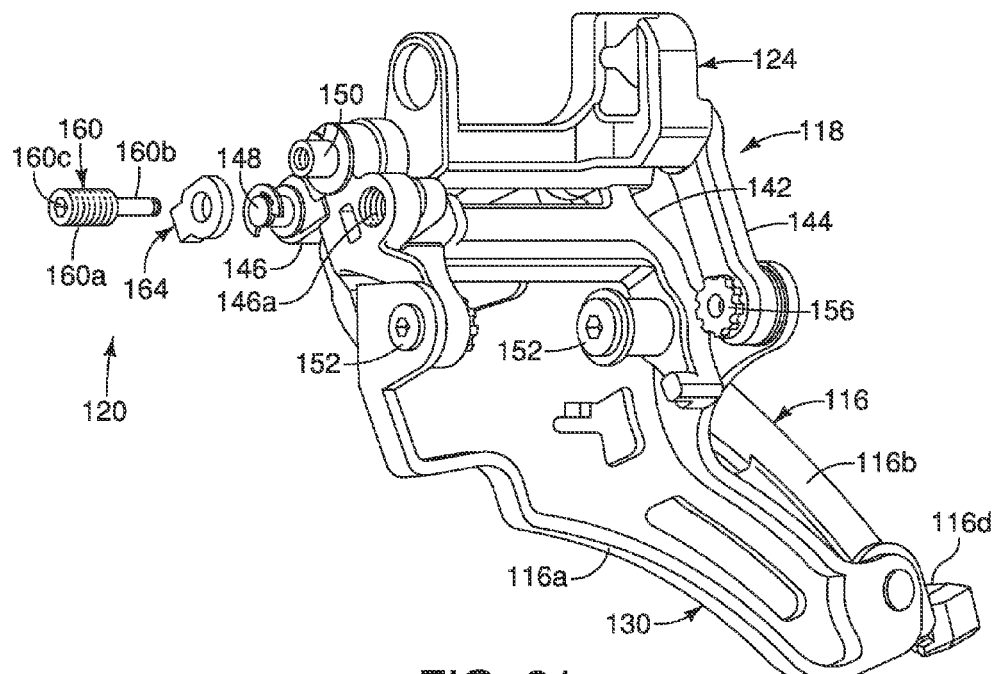
FIG. 21 is an inside perspective view of selected parts of the front derailleur illustrated in FIGS. 18 to 20 with the fixing structure being exploded from the first link and the driven link of the front derailleur.
Figure 22:
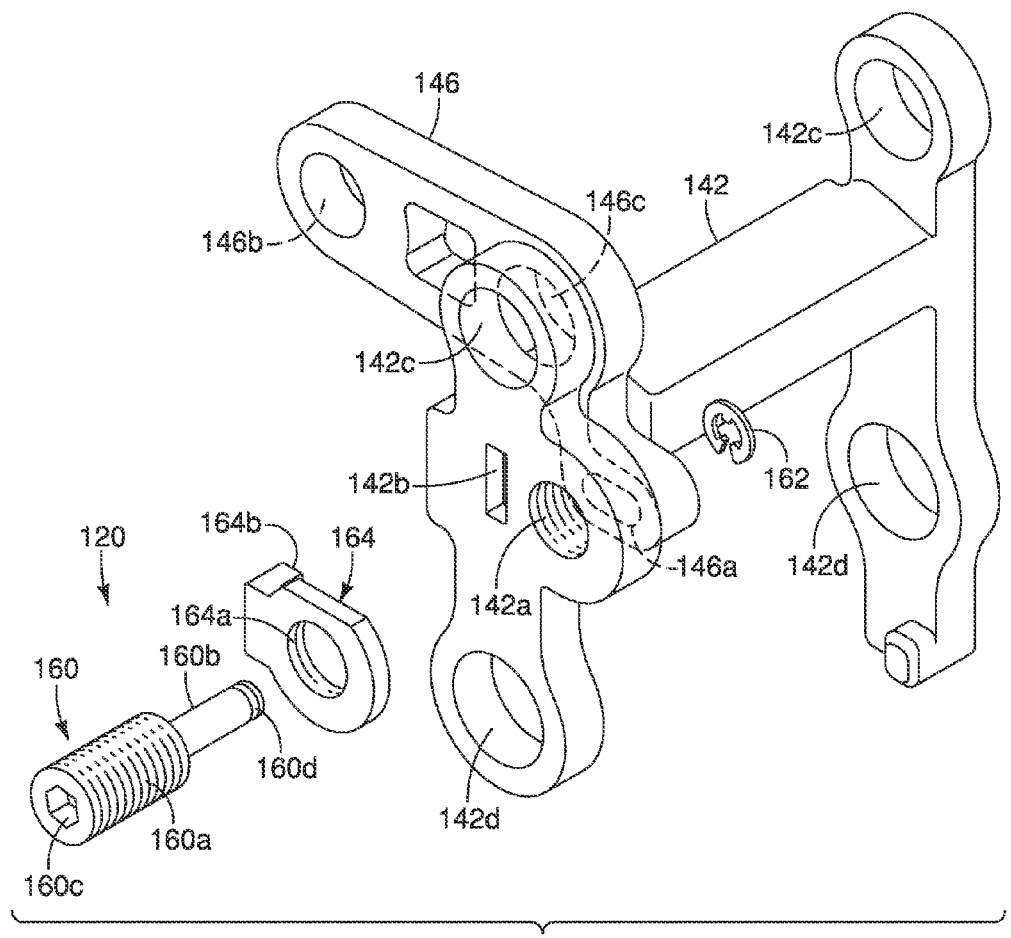
FIG. 22 is a perspective view of selected parts of the front derailleur illustrated in FIG. 16, with the fixing structure being exploded from the first link and the driven link of the front derailleur.
Figure 23:
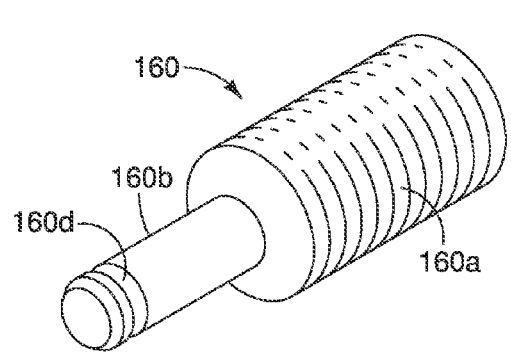
FIG. 23 is a perspective view of the positioning member of the fixing structure for the front derailleur illustrated in FIG. 16.
Figure 24:
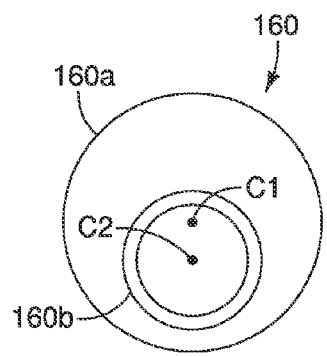
FIG. 24 is an end elevational view of the positioning member of the fixing structure for the front derailleur illustrated in FIG. 16.

As best seen in FIGS. 21 and 22, the fixing structure 20 basically includes a positioning member 160 that is inserted into the first link 142 and the driven link 146 so as to adjustably position the first link 142 relative to the driven link 146. Here in this illustrated embodiment, the positioning member 160 includes a threaded portion 160a and a shaft portion 160b. The threaded portion 160a and the shaft portion 160b comprise a cylindrical structure. The shaft portion 160b protrudes from one end surface of the threaded portion 160a in a longitudinal direction of the positioning member 160. Also the shaft portion 160a has a diameter that is less than diameter of the threaded portion 160a. Here, in this illustrated embodiment, the threaded portion 160a and the shaft portion 160b are integrally formed as a one-piece member. The shaft portion 160b is a cylindrical member that extends from one end of the threaded portion 160a. Preferably, the positioning member 160 is formed of a metallic material that is suitable for use in a derailleur. The threaded portion 160a engages with the first link 142, while the shaft portion 160b engages the driven link 146. The shaft portion 160b has a center axis C2 that is offset from a center axis C1 of the threaded portion 160a. In this way, the shaft portion 160b acts as a cam with respect to the threaded portion 160a. Thus, rotation of the threaded portion 160a causes the shaft portion 160b to move the driven link 146 relative to the first link 142 in order to establish a fixed rest position of the movable member 116 with respect to the fixed member 114.

One of the first link 142 and the driven link 146 includes a threaded screw bore and the other of the first link 142 and the driven link 146 includes a receiving portion. In the second illustrated embodiment, the first link 142 includes a threaded screw bore 142a, and the driven link 146 includes a receiving portion 146a. However, while the first link 142 includes a threaded screw bore and the driven link 146 includes the receiving portion, it will be apparent from this disclosure that the first link 142 can include the receiving portions and the driven link 146 can include the threaded screw bore. In any case, in this modification, one of the first link and the driven link includes a threaded screw bore and the other of the first link and the driven link includes the receiving portion.

The threaded portion 160a of the positioning member 160 has an external thread on an outer peripheral surface that screws into the threaded screw bore 142a of the first link 142. The shaft portion 160b of the positioning member 160 is received in the receiving portion 146a of the driven link 146. Thus, when the fixed member 114 is fixed to the bicycle frame 10, the threaded portion 160a is screwed into the threaded screw bore 142a, and the shaft portion 160b is disposed in the receiving portion 142a. The receiving portion 146a is an elongated slot that extends along inward and outward direction (lateral direction L) with respect to the bicycle frame 110 when the fixed member 114 is fixed to the bicycle frame 10. While the receiving portion 146a is shown as an opening that penetrates through the driven link 146, the receiving portion 146a can be a recess that does not penetrate through the driven link 146.

The threaded portion 160a of the positioning member 160 has a tool engagement surface 160c for rotating the positioning member 160 about the center axis C1. Here, the tool engagement surface 160c is a hexagonal recess formed in the other end surface of the threaded portion 160a of the positioning member 160. Of course, the tool engagement surface 160c can have any other configuration (e.g., a hexagonal exterior surface, a slot, a star shaped recess, etc.). To prevent the positioning member 160 from inadvertently falling out of the first link 142 and the driven link 146, the shaft portion 160b of the positioning member 160 includes a recess or groove 160d that receives a clip 162.

Preferably, the fixing structure 20 includes a fastening member 164 that aids in preventing the positioning member 160 from inadvertently loosening from the first link 142 and/or the driven link 146. In the second illustrated embodiment, the fastening member 164 has a threaded hole 164a and an anti-rotation member 164b. The anti-rotation member 161b is in the form of a tab that is received in a recess or opening 142b in the first link 142. The fastening member 164 is configured to fasten the threaded portion 160a to prevent the threaded portion 160a from being loosened with respect to the threaded screw bore 142a. Alternatively, the fastening member 164 can be replaced with a nut and a lock washer or just a nut. In other words, to prevent inadvertent loosening of the positioning member 160, the threaded portion 160a is screwed into the threaded hole 164a of the fastening member 164 and into the threaded screw bore 142a, while the anti-rotation member 164b is disposed in the opening 142b in the first link 142.

The first link 142 has a first opening 142c for receiving one of the pivot pins 150 and a second opening 142d for receiving one of the pivot pins 152. The threaded screw bore 142a is located between the first and second openings 142c and 142d. The driven link 146 has a first opening 146b for receiving connecting pin 148 and a second opening 146c for receiving one of the pivot pins 150. Thus, one of the pivot pins 150 pivotally supports the first link 142 and the driven link 146 on the base member 124. When the output shaft 126a of the electric motor unit 126 is operated, the drive linkage 128 pivots the driven link 146 on one of the pivot pins 150. Since the first link 142 is fixed to the driven link 146 by the fixing structure 120, the pivotal movement of the driven link 146 pivots the first link 142 about the single pivot axis P1. This pivotal movement of the first link 142 causes the movable member 116 to move in the lateral direction L with respect to the fixed member 114.

Figure 25:
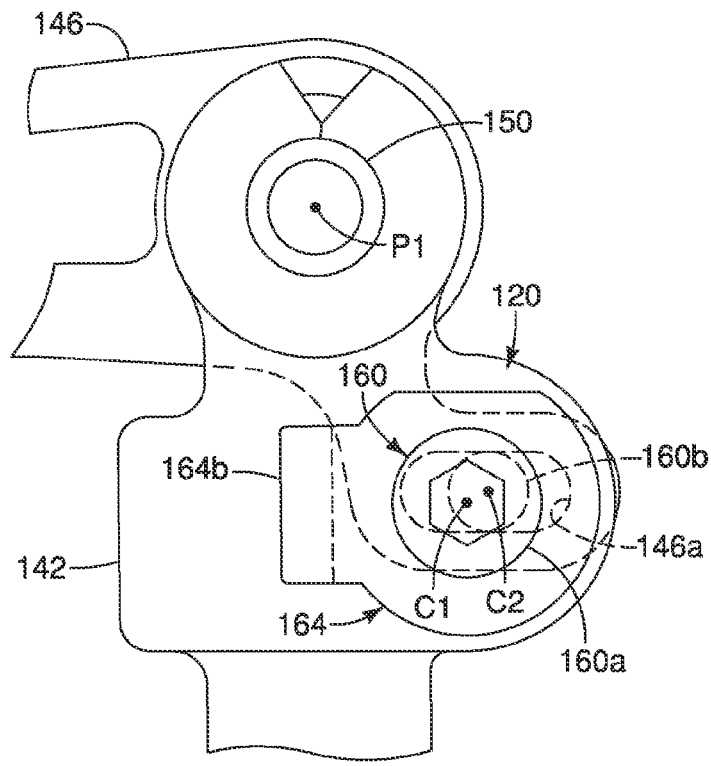
FIG. 25 is an enlarged, partial elevational view of the fixing structure, the first link and the driven link of the front derailleur illustrated in FIG. 16, with the first link in a first position.
Figure 26:
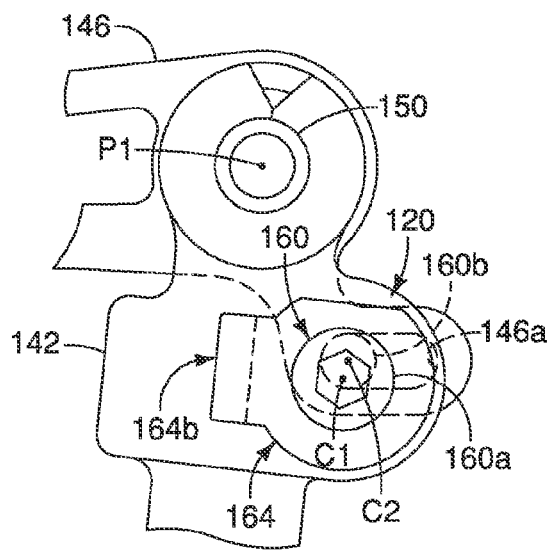
FIG. 26 is an enlarged, partial devotional view of the fixing structure, the first link and the driven link of the front derailleur illustrated in FIG. 16, with the first link in a second position.
Figure 27:
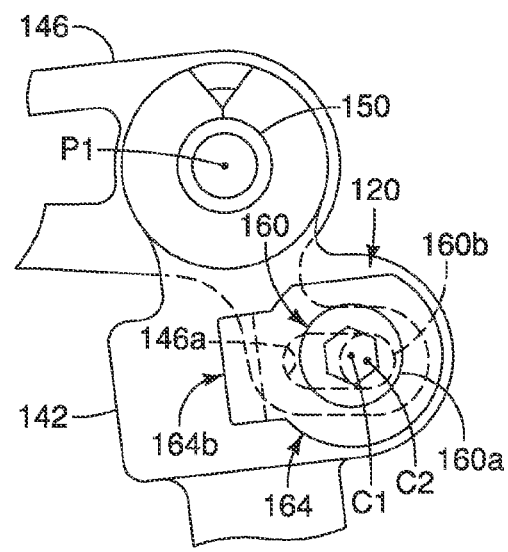
FIG. 27 is an enlarged, partial elevational view of the fixing structure, the first link and the driven link of the front derailleur illustrated in FIG. 16, with the first link in a third position.

In the second illustrated embodiment, by rotating threaded portion 160a, the positioning member 160 adjustably positions the first link 142 relative to the driven link 146 around the single pivot axis P1 to establish a fixed rest position of the movable member 116 with respect to the fixed member 114. As seen in FIG. 25, the shaft portion 160b of the positioning member 160 is disposed in a center area of the receiving portion 146a of the driven link 146 to hold the first link 142 in a first position and, thus, the movable member 116 (not shown in FIG. 25) in a first fixed rest position. By rotating threaded portion 160a, the shaft portion 160b moves in the receiving portion 146a of the driven link 146 so that the first link 142 pivots relative to the driven link 146 about the single pivot axis P1. If the threaded portion 160a is rotated 90 degree counterclockwise in FIG. 25, then the first link 142 pivots clockwise to a second position (FIG. 26) to hold the movable member 116 (not shown in FIGS. 25 to 27) in a second fixed rest position farther from the bicycle frame 10 than the first fixed rest position. If the threaded portion 160a is rotated 90 degree clockwise in FIG. 25, then the first link 142 pivots clockwise to a third position (FIG. 27) to hold the movable member 116 (not shown in FIGS. 25 to 27) in a third fixed rest position closer to the bicycle frame 10 than the first and third fixed rest position.

Figure 28:
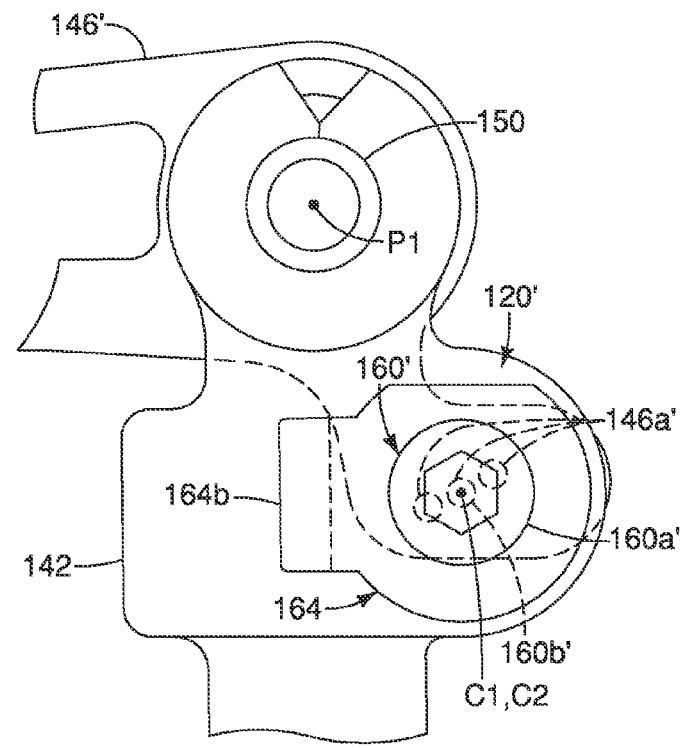
FIG. 28 is an enlarged, partial elevational view of an alternate fixing structure used with the first link and a modified driven link, with the first link in a first position.
Figure 29:
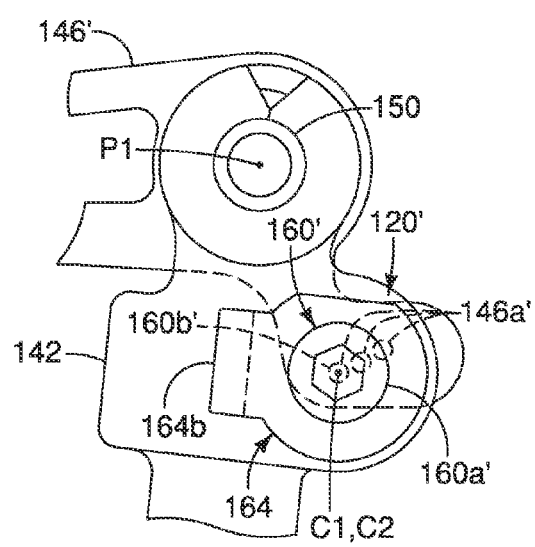
FIG. 29 is an enlarged, partial elevational view of the alternate fixing structure, the first link and the modified driven link illustrated in FIG. 28, with the first link in a second position.
Figure 30:
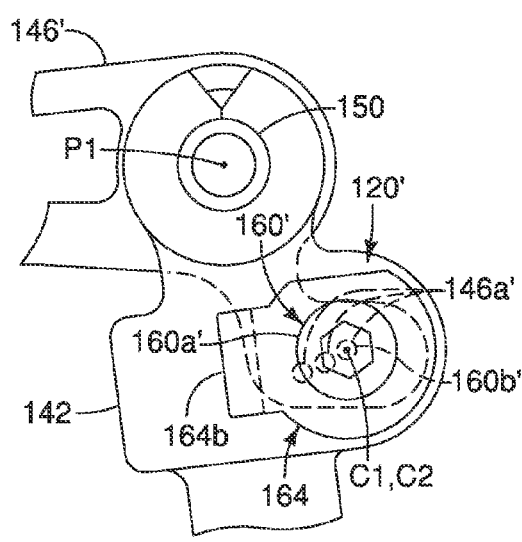
FIG. 30 is an enlarged, partial elevational view of the fixing structure, the first link and the modified driven link illustrated in FIGS. 28 and 29, with the first link in a third position.

Referring now to FIGS. 28 to 30, a modification of the fixing structure 20 will now be discussed. Here in this modification, a modified driven link 146' replaces the driven link 146, and a modified positioning member 160' replaces the positioning member 160. The other parts remain the same. The driven link 146 includes a plurality of receiving portions 146a' (e.g., three blind bores) arranged in inward and outward direction with respect to a bicycle frame 10 when the fixed member 114 is fixed to the bicycle frame 10. The positioning member 160' includes a threaded portion 160a' and a shaft portion 160b'. The shaft portion 160b' has a center axis C2 that is coincident with a center axis C1 of the threaded portion 160a'. The shaft portion 160b' is configured to be selectively disposed into one of the receiving portions 146a' to selectively establish a fixed rest position of the movable member 116 with respect to the fixed member 114. While the first link 142 includes a threaded screw bore and the driven link 146' includes the receiving portions, it will be apparent from this disclosure that the first link 142 can include one or more of the receiving portions and the driven link 146' can include the threaded screw bore. In any case, in this modification, the one of the first link and the driven link that includes the receiving portion preferably further includes at least one additional receiving portion.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms first and second may be used herein to describe various components these components should not be limited by these terms. These terms are only used to distinguish one component from another. Thus, for example, a first component discussed above could be termed a second component and vice-a-versa without departing from the teachings of the present invention. The foregoing also applies to words having similar meanings such as the terms, "including", "having" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially affect their intended function.

Although a four bar linkage is used in the illustrated embodiment, as discussed above, the movable member 16 can be connected to the fixed member 14 with other coupling arrangements. In other words, the front derailleur 12 can be configured to have a coupling arrangement which is constructed with a single link member, or which is constructed with more than two link members. Thus, the present invention can be used with electric front derailleurs that use other types of coupling arrangements.

Also components that are shown directly connected or contacting each other can have intermediate structures disposed between them, unless specifically stated otherwise. The functions of one element can be performed by two, and vice versa, unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A front derailleur comprising:
a fixed member configured to be fixed to a bicycle frame;
a movable member movably supported with respect to the fixed member;
a driven link operatively coupled to the movable member; and
a first link movably connecting the movable member to the fixed member and adjustably coupled to the driven link in a fixed position by a fixing structure to establish a fixed rest position of the movable member with respect to the fixed member, the fixing structure adjustably connecting the first link and the driven link together to establish a fixed position of the first link with respect to the driven link as the movable member moves with respect to the fixed member.

2. The front derailleur according to claim 1, wherein the first link and the driven link are pivotally mounted on the fixed member about a single pivot axis.

3. The front derailleur according to claim 2, wherein the fixing structure abuts opposite circumferentially facing sides of the driven link with respect to the pivot axis to establish the fixed rest position of the movable member.

4. The front derailleur according to claim 1, wherein the fixing structure includes a first bolt screwed into one of the first link and the driven link and abutting the other of the first link and the driven link, and a second bolt mounted on the one of the first link and the driven link and threaded into a movable abutment member that moves axially along a threaded shaft of the second bolt and that abuts the other of the first link and the driven link as the second bolt is turned about a screwing axis of the second bolt.

5. The front derailleur according to claim 4, wherein the first bolt is screwed into the first link and abuts the driven link, and the second bolt is mounted on the first link and the movable abutment member abuts the driven link.

6. The front derailleur according to claim 1, wherein the fixing structure includes a positioning member inserted into the first link and the driven link so as to adjustably position the first link relative to the driven link.

7. The front derailleur according to claim 6, wherein
the first link and the driven link are pivotally mounted on the fixed member about a single pivot axis, and
the positioning member adjustably positions the first link relative to the driven link around the single pivot axis.

8. The front derailleur according to claim 7, wherein
one of the first link and the driven link includes a threaded screw bore and the other of the first link and the driven link includes a receiving portion, and
the positioning member includes a threaded portion screwed into the threaded screw bore, and a shaft portion disposed in the receiving portion.

9. The front derailleur according to claim 8, wherein
the receiving portion is an elongated slot extending along inward and outward direction with respect to a bicycle frame when the fixed member is fixed to the bicycle frame.

10. The front derailleur according to claim 9, wherein
the shaft portion has a center axis that is offset from a center axis of the threaded portion.

11. The front derailleur according to claim 8, wherein
the first link and the driven link that includes the receiving portion further includes at least one additional receiving portion, the receiving portions being arranged in inward and outward direction with respect to a bicycle frame when the fixed member is fixed to the bicycle frame, and
the shaft portion is configured to be selectively disposed into one of the receiving portions.

12. The front derailleur according to claim 8, wherein
the fixing structure includes a fastening member configured to fasten the threaded portion to prevent the threaded portion from being loosened with respect to the threaded screw bore.

13. The front derailleur according to claim 1, wherein
the fixed member includes a base member and a motor unit, the motor unit having an output shaft operatively coupled to the driven link.

14. The front derailleur according to claim 1, further comprising
a second link movably connecting the movable member to the fixed member.

15. The front derailleur according to claim 14, wherein
the first and second links are pivotally connected to the fixed member and the movable member, and the movable member includes a chain cage portion.

16. The front derailleur according to claim 15, wherein
the first link is disposed between the chain cage portion and the second link.

17. The front derailleur according to claim 1, wherein
the fixing structure includes a first bolt screwed into one of the first link and the driven link and abutting the other of the first link and the driven link.

18. A front derailleur comprising:
a fixed member configured to be fixed to a bicycle frame;
a movable member movably supported with respect to the fixed member;
a driven link operatively coupled to the movable member;
a first link movably connecting the movable member to the fixed member and adjustably coupled to the driven link in a fixed position by a fixing structure to establish a fixed rest position of the movable member with respect to the fixed member,
the fixing structure including a first bolt screwed into one of the first link and the driven link and abutting the other of the first link and the driven link, and a second bolt mounted on the one of the first link and the driven link and threaded into a movable abutment member that moves axially along a threaded shaft of the second bolt and that abuts the other of the first link and the driven link as the second bolt is turned about a screwing axis of the second bolt,
the other of the first link and the driven link including a first inclined contact surface that inclines with respect to the screwing axis, and the movable abutment member including a second inclined contact surface that inclines with respect to the screwing axis so as to face and contact the first inclined contact surface to prevent movement of the other of the first link and the driven link.

19. A front derailleur comprising:
a fixed member configured to be fixed to a bicycle frame;
a movable member movably supported with respect to the fixed member;
a driven link operatively coupled to the movable member;
a first link movably connecting the movable member to the fixed member and adjustably coupled to the driven link in a fixed position by a fixing structure to establish a fixed rest position of the movable member with respect to the fixed member,
the fixing structure including a first bolt screwed into one of the first link and the driven link and abutting the other of the first link and the driven link, and a second bolt mounted on the one of the first link and the driven link and threaded into a movable abutment member that moves axially along a threaded shaft of the second bolt and that abuts the other of the first link and the driven link as the second bolt is turned about a screwing axis of the second bolt, the first bolt is screwed into the first link and abuts the driven link, and the second bolt is mounted on the first link and the movable abutment member abuts the driven link,
the driven link including a first inclined contact surface that inclines with respect to the screwing axis, and the movable abutment member including a second inclined contact surface that inclines with respect to the screwing axis so as to face and contact the first inclined contact surface to prevent movement of the driven link.

* * * * *